(12) United States Patent
Novakovic et al.

(10) Patent No.: US 9,734,063 B2
(45) Date of Patent: Aug. 15, 2017

(54) SCALE-OUT NON-UNIFORM MEMORY ACCESS

(71) Applicant: Ecole Polytechnique Federale de Lausanne, Lausanne (CH)

(72) Inventors: Stanko Novakovic, Lausanne (CH); Alexandros Daglis, St-Sulpice (CH); Boris Robert Grot, Edinburgh (GB); Edouard Bugnion, Pully (CH); Babak Falsafi, Chexbres (CH)

(73) Assignee: ÉCOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 157 days.

(21) Appl. No.: 14/634,391

(22) Filed: Feb. 27, 2015

(65) Prior Publication Data

US 2015/0242324 A1      Aug. 27, 2015

Related U.S. Application Data

(60) Provisional application No. 61/945,705, filed on Feb. 27, 2014.

(51) Int. Cl.
*G06F 13/00* (2006.01)
*G06F 12/0813* (2016.01)
(Continued)

(52) U.S. Cl.
CPC ...... *G06F 12/0813* (2013.01); *G06F 12/0811* (2013.01); *G06F 12/0815* (2013.01);
(Continued)

(58) Field of Classification Search
None
See application file for complete search history.

(56) References Cited

U.S. PATENT DOCUMENTS

| | | | |
|---|---|---|---|
| 2003/0009643 A1* | 1/2003 | Arimilli | G06F 12/0813 711/155 |
| 2006/0179173 A1* | 8/2006 | Bockhaus | G06F 12/1054 710/22 |

(Continued)

FOREIGN PATENT DOCUMENTS

WO    WO 2011053488    5/2011

OTHER PUBLICATIONS

Christopher Mitchell et al., Using One-Sided RDMA Reads to Build a Fast, CPU-Efficient Key-Value Store, 2013 USENIX Annual Technical Conference (USENIX ATC '13), pp. 103-104.*
(Continued)

*Primary Examiner* — Sean D Rossiter
(74) *Attorney, Agent, or Firm* — Davis Wright Tremaine LLP; Philip H. Albert

(57) ABSTRACT

A computing system that uses a Scale-Out NUMA ("soNUMA") architecture, programming model, and/or communication protocol provides for low-latency, distributed in-memory processing. Using soNUMA, a programming model is layered directly on top of a NUMA memory fabric via a stateless messaging protocol. To facilitate interactions between the application, OS, and the fabric, soNUMA uses a remote memory controller—an architecturally-exposed hardware block integrated into the node's local coherence hierarchy.

17 Claims, 15 Drawing Sheets

(51) Int. Cl.
     *G06F 12/0811*     (2016.01)
     *G06F 12/0815*     (2016.01)
(52) U.S. Cl.
     CPC .............. *G06F 2212/1048* (2013.01); *G06F 2212/2542* (2013.01); *Y02B 60/1225* (2013.01)

(56) References Cited

U.S. PATENT DOCUMENTS

| | | | |
|---|---|---|---|
| 2012/0290706 A1* | 11/2012 | Lin | G06F 8/60 709/224 |
| 2015/0095008 A1* | 4/2015 | Wang | G06F 11/3608 703/20 |
| 2015/0120224 A1* | 4/2015 | Siebel | G06Q 50/06 702/61 |

OTHER PUBLICATIONS

Agarwal et al., "The MIT Alewife Machine: Architecture and Performance" Proceedings of the 22nd International Symposium on Computer Architecture (ISCA), Jun. 22-24, 1995, pp. 2-13.

Amza et al., "TreadMarks: Shared Memory Computing on Networks of Workstations," IEEE Computer, 29(2):18-28, Feb. 1996, pp. 18-28.

Barham et al., "Xen and the Art of Virtualization," Proceedings of the 19th ACM Symposium on Operating Systems Principles (SOSP), 2003, pp. 164-177.

Baumann et al., "The Multikernel: a New OS Architecture for Scalable Multicore Systems," Proceedings of the 22nd ACM Symposium on Operating Systems Principles (SOSP), 2009, pp. 29-44.

Blinkert et al., "Integrated Network Interfaces for High-Bandwidth TCP/IP," Proceedings of the 12th International Conference on Architectural Support for Programming Languages and Operating Systems (ASPLOS-XII), 2006, pp. 315-324.

Blumrich et al., "Virtual Memory Mapped Network Interface for the SHRIMP Multicomputer," Proceedings of the 21st International Symposium on Computer Architecture (ISCA), 1994, pp. 473-484.

Bonachea, D., "Proposal for Extending the UPC Memory Copy Library Functions and Supporting Extensions to GASNet Version 2.0," Mar. 22, 2007, 22 pages.

Calxeda Inc. Calxeda Energy Core ECX-1000 Fabric Switch. http://www.calxeda.com/architecture/fabric/, 2012.

Calxeda Inc. ECX-1000 Technical Specifications. http://www.calxeda.com/ecx-1000-techspecs/, 2012.

Carter et al., "Implementation and Performance of Munin," Proceedings of the 13th ACM Symposium on Operating Systems Principles (SOSP), 1991, pp. 152-164.

Chapin et al., "Hive: Fault Containment for Shared-Memory Multiprocessors," Proceedings of the 15th ACM Symposium on Operating Systems Principles (SOSP), 1995, pp. 12-25.

Chapman et al., "vNUMA: A Virtual Shared-Memory Multiprocessor," Proceedings of the 2009 conference on USENIX Annual Technical Conference, 2009, 13 pages.

Coarfa et al., "An Evaluation of Global Address Space Languages: Co-Array Fortran and Unified Parallel C," Proceedings of the ACM SIGPLAN Symposium on Principles and Practice of Parallel Programming (PPOPP), 2005, pp. 36-47.

Culler et al., "Parallel Programming in Split-C," Proceedings of the 1993 ACM/IEEE Conference on Supercomputing (SC), Nov. 15-19, 1993, pp. 262-273.

DeCandia et al., "Dynamo: Amazon's Highly Available Key-Value Store," Proceedings of the 21st ACM Symposium on Operating Systems Principles (SOSP), 2007, pp. 205-220.

Dhodapkar et al., "SeaMicro SM10000-64 Server: Building Datacenter Servers Using Cell Phone Chips," Proceedings of the 23rd IEEE HotChips Symposium, 2011.

Falsafi et al., "Reactive NUMA: A Design for Unifying S-COMA and CC-NUMA," Proceedings of the 24th International Symposium on Computer Architecture (ISCA), 1997, pp. 229-240.

Falsafi et al., "Application-Specific Protocols for User-Level Shared Memory," Proceedings of the 1994 ACM/IEEE Conference on Supercomputing (SC), 1994, pp. 380-389.

Flajslik et al., "Network Interface Design for Low Latency Request-Response Protocols," Proceedings of the 2013 USENIX Annual Technical Conference, 2013, pp. 333-346.

Gillett, R., "Memory Channel: An Optimized Cluster Interconnect," IEEE Micro, 16(2):12-18, 1996, pp. 12-18.

Heinlein et al., "Integration of Message Passing and Shared Memory in the Stanford FLASH Multiprocessor," Proceedings of the 6th International Conference on Architectural Support for Programming Languages and Operating Systems (ASPLOS-VI), 1994, pp. 38-50.

HPC Advisory Council, "Interconnect Analysis: 10GigE and InfiniBand in High Performance Computing" retrieved from the internet at http://www.hpcadvisorycouncil.com/pdf/IB_and_10GigE_in_HPC.pdf, 2009, 8 pages.

Kessler et al., "Cray T3D: A New Dimension for Cray Research," Compcon Spring '93, Digest of Papers, Feb. 22-26, 1993, pp. 176-182.

Kuskin et al., "The Stanford FLASH Multiprocessor," Proceedings of the 21st International Symposium on Computer Architecture (ISCA), Apr. 18-21, 1994, pp. 302-313.

Kwak et al., "What is Twitter, a Social Network or a News Media?" Proceedings of the 19th International Conference on World Wide Web (WWW), 2010, pp. 591-600.

Lenoski et al., "The Stanford Dash Multiprocessor," IEEE Computer, 25(3):63-79, Mar. 1992, pp. 63-79.

Li et al., "Memory Coherence in Shared Virtual Memory Systems," ACM Transactions on Computer Systems (TOCS), vol. 7, No. 4, Nov. 1989, pp. 321-359.

Liu et al., "High Performance RDMA-Based MPI Implementation over InfiniBand. International Journal of Parallel Programming," vol. 32, No. 3, Jun. 2004, pp. 167-198.

Lotfi-Kamran et al., "Scale-Out Processors," Proceedings of the 39th International Symposium on Computer Architecture (ISCA), 2012, pp. 500-511.

Mackenzie et al., "Fugu: Implementing Translation and Protection in a Multiuser, Multimodel Multiprocessor," Proceedings of the 1994 Workshop on Shared Memory Multiprocessors, Oct. 24, 1994, 30 pages.

Malewicz et al., "Pregel: A System for Large-Scale Graph Processing," Proceedings of the ACM International Conference on Management of Data (SIGMOD), 2010, pp. 135-146.

Mellanox Corp. ConnectX-3 Pro Product Brief. http://www.mellanox.com/related-docs/prod_adapter_cards/ PB_ConnectX-3_Pro_Card_EN.pdf, 2012.

Mellanox Corp. RDMA Aware Networks Programming User Manual, Rev 1.4. http://www.mellanox.com/related-docs/prod_software/RDMA_Aware_Programming_user_manual.pdf, 2013.

Mitchell et al., "Using One-Sided RDMA Reads to Build a Fast, CPU-Efficient Key-Value Store," Proceedings of the USENIX Annual Technical Conference, Jun. 2013, pp. 103-114.

Mukherjee et al., "The Alpha 21364 Network Architecture," Hot Interconnects IX, Aug. 22-24, 2001, pp. 113-117.

Mukherjee et al., "Coherent Network Interfaces for Fine-Grain Communication," Proceedings of the 23rd International Symposium on Computer Architecture (ISCA), May 22-24, 1996, pp. 247.

Nelson et al., "Crunching Large Graphs with Commodity Processors," Proceedings of the 3rd USENIX Conference on Hot Topics in Parallelism (HotPar), 2011.

Noordergraaf et al., "Performance Experiences on Sun's WildFire Prototype," Proceedings of the 1999 ACM/IEEE Conference on Supercomputing (SC), Article No. 38, 1999, 16 pages.

Ongaro et al., "Fast Crash Recovery in RAMCloud," Proceedings of the 23rd ACM Symposium on Operating Systems Principles (SOSP), 2011, pp. 29-41.

Oracle Corp. Oracle Exalogic Elastic Cloud X3-2 (Datasheet). http://www.oracle.com/us/products/middleware/exalogic/overview/index.html, 2013.

Page et al., "The PageRank Citation Ranking: Bringing Order to the Web," Stanford InfoLab Technical Report, 1999, 17 pages.

(56) References Cited

OTHER PUBLICATIONS

Pakin et al., "High performance messaging on workstations: Illinois Fast Messages (FM) for Myrinet," Proceedings of the 1995 ACM/IEEE Conference on Supercomputing. ACM, Article No. 55, 1995, 28 pages.

Recio et al., "A Remote Direct Memory Access Protocol Specification," RFC 5040, Oct. 2007.

Reinhardt et al., "Tempest and Typhoon: User-Level Shared Memory," Proceedings of the 21st International Symposium on Computer Architecture (ISCA), Apr. 1994 pp. 497-508.

Rosenfeld et al., "DRAMSim2: A Cycle Accurate Memory System Simulator," Computer Architecture Letters, vol. 10, No. 1, Mar. 17, 2011, pp. 16-19.

Rumble et al., "It's Time for Low Latency," Proceedings of the 13th USENIX Conference on Hot Topics in Operating Systems, 2011.

Scales et al., "Shasta: A, Low Overhead, Software-Only Approach for Supporting Fine-Grain Shared Memory," Proceedings of the 7th International Conference on Architectural Support for Programming Languages and Operating Systems (ASPLOS-VII), 1996, pp. 174-185.

Schoinas et al., "Fine-Grain Access Control for Distributed Shared Memory," Proceedings of the 6th International Conference on Architectural Support for Programming Languages and Operating Systems (ASPLOS-VI), Oct. 1994, pp. 297-306.

Scott et al., "The Cray T3E Network: Adaptive Routing in a High Performance 3D Torus," Hot Interconnects IV, 1996.

Shelach, S., Mellanox wins $200m Google, Microsoft deals. http://www.globes.co.il/serveen/globes/docview.asp?did=1000857043&fid=1725, Jun. 25, 2013.

Snell et al., "Netpipe: A Network Protocol Independent Performance Evaluator," IASTED International Conference on Intelligent Information Management and Systems, vol. 6, 1996.

Stets et al., "Cashmere-2L: Software Coherent Shared Memory on a Clustered Remote-Write Network," In Proceedings of the 16th ACM Symposium on Operating Systems Principles (SOSP), Oct. 1997, pp. 170-183.

Valiant et al., "A Bridging Model for Parallel Computation," Communications of the ACM, 33(8):103-111, 1990.

Von Eicken et al., "U-Net: A User-Level Network Interface for Parallel and Distributed Computing," Proceedings of the 15th ACM Symposium on Operating Systems Principles (SOSP), 1995, pp. 40-53.

Wenisch et al., "SimFlex: Statistical Sampling of Computer System Simulation," IEEE Micro, 26:18-31, 2006, pp. 18-31.

WinterCorp. Big Data and Data Warehousing. http://www.wintercorp.com/.

Yelick et al., "Productivity and Performance Using Partitioned Global Address Space Languages," Workshop on Parallel Symbolic Computation (PASCO), 2007, pp. 24-32.

* cited by examiner

```
float *async_dest_addr [MAX_WQ_SIZE];
Vertex lbuf [MAX_WQ_SIZE];

inline void pagerank-async (int slot, void *arg) {
    *async_dest_addr [slot] += 0.85 *
    lbuf [slot] . rank [superstep%2] / lbuf [slot] .out_degree;
{ void pagerank_superstepl (QP *qp) {
    int evenodd = (superstep+1) % 2;
    for (int v=first_vertext; v<=last_vertex; v++); {
      vertices[v].rank[evenodd] = 0.15 / total.num_vertices;
      for (int e=vertices [v] . start; e<vertices [v] . end; e++) {
        if (edges [e] . is local) {
          // shared memory model
          Vertex *v2 = (Vertex *) edges [e] . v;
          vertices[v].rank[evenodd] += 0.85 *
            v2->rank [superstep%.2] / v2->out_degree;
        { else {
          // flow control
          int slot = rmc_wait_for_slot (qp, pagerank_async);
          // setup callback arguments
          async_dest_addr [slot] = &vertices[v] . rank[evenodd];
          // issue split operation
          rmc_read.async (qp, slot,
                  edges[e].nid,      //remote node ID
                  edges[e].offset,   //offset
                  &lbuf [slot] ,     //local buffer
                  sizeof (Vertex)) ; //len
        }
       }
     }
    }
    rmc_drain_cq (qp, pagerank_async);
    superstep++;
}
```

FIG. 4

SCALE-OUT NON-UNIFORM MEMORY ACCESS

CROSS-REFERENCES TO PRIORITY AND RELATED APPLICATIONS

This application claims priority from and is a non-provisional of U.S. Provisional Patent Application No. 61/945,705, filed Feb. 27, 2014, entitled "SCALE-OUT NUMA." The entire disclosure of the application recited above is hereby incorporated by reference, as if set forth in full in this document, for all purposes.

FIELD OF THE INVENTION

The present invention relates generally to non-uniform memory access ("NUMA") generally and more specifically to methods and apparatus for dealing with memory access for large datasets with latency constraints on memory access.

BACKGROUND OF THE INVENTION

Datacenter applications are rapidly evolving from simple data-serving tasks to sophisticated analytics operating over enormous datasets in response to real-time queries. To minimize the response latency, datacenter operators keep the data in memory. As dataset sizes push into the petabyte range, the number of servers required to house them in memory can easily reach into hundreds or even thousands.

Because of the distributed memory, applications that traverse large data structures (e.g., graph algorithms) or frequently access disparate pieces of data (e.g., key-value stores) must do so over the datacenter network. As today's datacenters are built with commodity networking technology running on top of commodity servers and operating systems, node-to-node communication delays can exceed 100 microseconds ("µs"). In contrast, accesses to local memory incur delays of around 60 nanoseconds ("ns")—a factor of 1000 less. The irony is rich: moving the data from disk to main memory yields a 100,000× reduction in latency (10 milliseconds ("ms") vs. 100 ns), but distributing the memory eliminates 1000× of the benefit.

The reasons for the high communication latency are well known and include deep network stacks, complex network interface cards ("NIC"), and slow chip-to-NIC interfaces. Remote direct access memory ("RDMA") reduces end-to-end latency by enabling memory-to-memory data transfers over InfiniBand and Converged Ethernet fabrics. By exposing remote memory at user-level and offloading network processing to the adapter, RDMA enables remote memory read latencies as low as 1.19 µs; however, that still represents a >10× latency increase over local dynamic random-access memory ("DRAM").

Thus, improvements would be desirable.

REFERENCES

A. Agarwal, R. Bianchini, D. Chaiken, K. L. Johnson, D. A. Kranz, J. Kubiatowicz, B.-H. Lim, K. Mackenzie, and D. Yeung. The MIT Alewife Machine: Architecture and Performance. In Proceedings of the 22nd International Symposium on Computer Architecture (ISCA), 1995.

C. Amza, A. L. Cox, S. Dwarkadas, P. J. Keleher, H. Lu, R. Rajamony, W. Yu, and W. Zwaenepoel. Treadmarks: Shared Memory Computing on Networks of Workstations. IEEE Computer, 29(2):18-28, 1996.

P. Barham, B. Dragovic, K. Fraser, S. Hand, T. L. Harris, A. Ho, R. Neugebauer, I. Pratt, and A. Warfield. Xen and the Art of Virtualization. In Proceedings of the 19th ACM Symposium on Operating Systems Principles (SOSP), 2003.

A. Baumann, P. Barham, P.-E. Dagand, T. L. Harris, R. Isaacs, S. Peter, T. Roscoe, A. Schupbach, and A. Singhania. The Multikernel: a New OS Architecture for Scalable Multicore Systems. In Proceedings of the 22nd ACM Symposium on Operating Systems Principles (SOSP), 2009.

N. L. Binkert, A. G. Saidi, and S. K. Reinhardt. Integrated Network Interfaces for High-Bandwidth TCP/IP. In Proceedings of the 12th International Conference on Architectural Support for Programming Languages and Operating Systems (ASPLOS-XII), 2006.

M. A. Blumrich, K. Li, R. Alpert, C. Dubnicki, E. W. Felten, and J. Sandberg. Virtual Memory Mapped Network Interface for the SHRIMP Multicomputer. In Proceedings of the 21st International Symposium on Computer Architecture (ISCA), 1994.

D. Bonachea. Proposal for Extending the UPC Memory Copy Library Functions and Supporting Extensions to GASNet, Version 2.0. 2007.

Calxeda Inc. Calxeda Energy Core ECX-1000 Fabric Switch. http://www.calxeda.com/architecture/fabric/, 2012.

Calxeda Inc. ECX-1000 Technical Specifications. http://www.calxeda.com/ecx-1000-techspecs/, 2012.

J. B. Carter, J. K. Bennett, and W. Zwaenepoel. Implementation and Performance of Munin. In Proceedings of the 13th ACM Symposium on Operating Systems Principles (SOSP), 1991.

J. Chapin, M. Rosenblum, S. Devine, T. Lahiri, D. Teodosiu, and A. Gupta. Hive: Fault Containment for Shared-Memory Multiprocessors. In Proceedings of the 15th ACM Symposium on Operating Systems Principles (SOSP), 1995.

M. Chapman and G. Heiser. vNUMA: A Virtual Shared-Memory Multiprocessor. In Proceedings of the 2009 conference on USENIX Annual Technical Conference, 2009.

C. Coarfa, Y. Dotsenko, J. M. Mellor-Crummey, F. Cantonnet, T. A. El-Ghazawi, A. Mohanti, Y. Yao, and D. G. Chavarrfa-Miranda. An Evaluation of Global Address Space Languages: Co-Array Fortran and Unified Parallel C. In Proceedings of the ACM SIGPLAN Symposium on Principles and Practice of Parallel Programming (PPOPP), 2005.

D. Crupnicoff. Personal communication (Mellanox Corp.), 2013.

D. E. Culler, A. C. Arpaci-Dusseau, S. C. Goldstein, A. Krishnamurthy, S. Lumetta, T. von Eicken, and K. A. Yelick. Parallel Programming in Split-C. In Proceedings of the 1993 ACM/IEEE Conference on Supercomputing (SC), 1993.

M. Davis and D. Borland. System and Method for High-Performance, Low-Power Data Center Interconnect Fabric. WO Patent 2,011,053,488, 2011.

G. DeCandia, D. Hastorun, M. Jampani, G. Kakulapati, A. Lakshman, A. Pilchin, S. Sivasubramanian, P. Vosshall, and W. Vogels. Dynamo: Amazon's Highly Available Key-Value Store. In Proceedings of the 21st ACM Symposium on Operating Systems Principles (SOSP), 2007.

A. Dhodapkar, G. Lauterbach, S. Li, D. Mallick, J. Bauman, S. Kanthadai, T. Kuzuhara, G. S. M. Xu, and C. Zhang. SeaMicro SM10000-64 Server: Building Datacenter Servers Using Cell Phone Chips. In Proceedings of the 23rd IEEE HotChips Symposium, 2011.

B. Falsafi and D. A. Wood. Reactive NUMA: A Design for Unifying S-COMA and CC-NUMA. In Proceedings of the 24th International Symposium on Computer Architecture (ISCA), 1997.

B. Falsafi, A. R. Lebeck, S. K. Reinhardt, I. Schoinas, M. D. Hill, J. R. Larus, A. Rogers, and D. A. Wood. Application-Specific Protocols for User-Level Shared Memory. In Proceedings of the 1994 ACM/IEEE Conference on Supercomputing (SC), 1994.

M. Flajslik and M. Rosenblum. Network Interface Design for Low Latency Request-Response Protocols. In Proceedings of the 2013 USENIX Annual Technical Conference, 2013.

R. Gillett. Memory Channel: An Optimized Cluster Interconnect. IEEE Micro, 16(2):12-18, 1996.

J. Heinlein, K. Gharachorloo, S. Dresser, and A. Gupta. Integration of Message Passing and Shared Memory in the Stanford FLASH Multiprocessor. In Proceedings of the 6th International Conference on Architectural Support for Programming Languages and Operating Systems (ASPLOS-VI), 1994.

HPC Advisory Council. Interconnect Analysis: 10GigE and InfiniBand in High Performance Computing. http://www.hpcadvisorycouncil.com/pdf/IB_and_10GigE_in_HPC.pdf, 2009.

IEEE 802.1Qbb: Priority-Based Flow Control. IEEE, 2011.

InfiniBand Trade Association. InfiniBand Architecture Specification: Release 1.0. 2000.

R. Kessler and J. Schwarzmeier. Cray T3D: A New Dimension for Cray Research. In Compcon Spring '93, Digest of Papers, 1993.

J. Kuskin, D. Ofelt, M. Heinrich, J. Heinlein, R. Simoni, K. Gharachorloo, J. Chapin, D. Nakahira, J. Baxter, M. Horowitz, A. Gupta, M. Rosenblum, and J. L. Hennessy. The Stanford FLASH Multiprocessor. In Proceedings of the 21st International Symposium on Computer Architecture (ISCA), 1994.

H. Kwak, C. Lee, H. Park, and S. B. Moon. What is Twitter, a Social Network or a News Media? In Proceedings of the 19th International Conference on World Wide Web (WWW), 2010.

D. Lenoski, J. Laudon, K. Gharachorloo, W.-D. Weber, A. Gupta, J. L. Hennessy, M. Horowitz, and M. S. Lam. The Stanford Dash Multiprocessor. IEEE Computer, 25(3):63-79, 1992.

K. Li and P. Hudak. Memory Coherence in Shared Virtual Memory Systems. ACM Trans. Comput. Syst., 7(4):321-359, 1989.

J. Liu, J. Wu, and D. K. Panda. High Performance RDMA-Based MPI Implementation over InfiniBand. International Journal of Parallel Programming, 32(3):167-198, 2004.

P. Lotfi-Kamran, B. Grot, M. Ferdman, S. Volos, Y. O. Kocberber, J. Picorel, A. Adileh, D. Jevdjic, S. Idgunji, E. Ozer, and B. Falsafi. Scale-Out Processors. In Proceedings of the 39th International Symposium on Computer Architecture (ISCA), 2012.

K. Mackenzie, J. Kubiatowicz, A. Agarwal, and F. Kaashoek. Fugu: Implementing Translation and Protection in a Multiuser, Multimodel Multiprocessor. In Proceedings of the 1994 Workshop on Shared Memory Multiprocessors, 1994.

G. Malewicz, M. H. Austern, A. J. C. Bik, J. C. Dehnert, I. Horn, N. Leiser, and G. Czajkowski. Pregel: A System for Large-Scale Graph Processing. In Proceedings of the ACM International Conference on Management of Data (SIGMOD), 2010.

Mellanox Corp. ConnectX-3 Pro Product Brief http://www.mellanox.com/related-docs/prod_adapter_cards/PB_ConnectX-3_Pro_Card_EN.pdf, 2012.

Mellanox Corp. RDMA Aware Networks Programming User Manual, Rev 1.4. http://www.mellanox.com/related-docs/prod_software/RDMA_Aware_programming_user_manual.pdf, 2013.

C. Mitchell, Y. Geng, and J. Li. Using One-Sided RDMA Reads to Build a Fast, CPU-Efficient Key-Value Store. In Proceedings of the USENIX Annual Technical Conference, 2013.

S. Mukherjee, P. Bannon, S. Lang, A. Spink, and D. Webb. The Alpha 21364 Network Architecture. In Hot Interconnects IX, 2001.

S. S. Mukherjee, B. Falsafi, M. D. Hill, and D. A. Wood. Coherent Network Interfaces for Fine-Grain Communication. In Proceedings of the 23rd International Symposium on Computer Architecture (ISCA), 1996.

J. Nelson, B. Myers, A. H. Hunter, P. Briggs, L. Ceze, C. Ebeling, D. Grossman, S. Kahan, and M. Oskin. Crunching Large Graphs with Commodity Processors. In Proceedings of the 3rd USENIX Conference on Hot Topics in Parallelism (HotPar), 2011.

L. Noordergraaf and R. van der Pas. Performance Experiences on Sun's WildFire Prototype. In Proceedings of the ACM/IEEE Conference on Supercomputing (SC), 1999.

D. Ongaro, S. M. Rumble, R. Stutsman, J. K. Ousterhout, and M. Rosenblum. Fast Crash Recovery in RAMCloud. In Proceedings of the 23rd ACM Symposium on Operating Systems Principles (SOSP), 2011.

Oracle Corp. Oracle Exalogic Elastic Cloud X3-2 (Datasheet). http://www.oracle.com/us/products/middleware/exalogic/overview/index.html, 2013.

L. Page, S. Brin, R. Motwani, and T. Winograd. The PageRank Citation Ranking: Bringing Order to the Web. Stanford InfoLab Technical Report, 1999.

S. Pakin, M. Lauria, and A. Chien. High performance messaging on workstations: Illinois Fast Messages (FM) for Myrinet. In Proceedings of the 1995 ACM/IEEE Conference on Supercomputing. ACM, 1995.

R. Recio, B. Metzler, P. Culley, J. Hilland, and D. Garcia. A Remote Direct Memory Access Protocol Specification. RFC 5040, 2007.

S. K. Reinhardt, J. R. Larus, and D. A. Wood. Tempest and Typhoon: User-Level Shared Memory. In Proceedings of the 21st International Symposium on Computer Architecture (ISCA), 1994.

P. Rosenfeld, E. Cooper-Balis, and B. Jacob. DRAMSim2: A Cycle Accurate Memory System Simulator. Computer Architecture Letters, 10(1):16-19, 2011.

S. M. Rumble, D. Ongaro, R. Stutsman, M. Rosenblum, and J. K. Ousterhout. It's Time for Low Latency. In Proceedings of the 13th USENIX Conference on Hot Topics in Operating Systems, 2011.

D. J. Scales, K. Gharachorloo, and C. A. Thekkath, Shasta: A, Low Overhead, Software-Only Approach for Supporting Fine-Grain Shared Memory. In Proceedings of the 7th International Conference on Architectural Support for Programming Languages and Operating Systems (ASPLOS-VII), 1996.

I. Schoinas, B. Falsafi, A. R. Lebeck, S. K. Reinhardt, J. R. Larus, and D. A. Wood. Fine-Grain Access Control for Distributed Shared Memory. In Proceedings of the 6th International Conference on Architectural Support for Programming Languages and Operating Systems (ASPLOS-VI), 1994.

S. L. Scott and G. M. Thorson. The Cray T3E Network: Adaptive Routing in a High Performance 3D Torus. In Hot Interconnects IV, 1996.

S. Shelach. Mellanox wins $200 m Google, Microsoft deals. http://www.globes.co.il/serveen/globes/docview.asp?did=1000857043&fid=1725, 2013.

Q. O. Snell, A. R. Mikler, and J. L. Gustafson. Netpipe: A Network Protocol Independent Performance Evaluator. In TASTED International Conference on Intelligent Information Management and Systems, volume 6, 1996.

R. Stets, S. Dwarkadas, N. Hardavellas, G. C. Hunt, L. I. Kontothanassis, S. Parthasarathy, and M. L. Scott. Cashmere-2L: Software Coherent Shared Memory on a Clustered Remote-Write Network. In Proceedings of the 16th ACM Symposium on Operating Systems Principles (SOSP), 1997.

L. G. Valiant. A Bridging Model for Parallel Computation. Communications of the ACM, 33(8):103-111, 1990.

T. von Eicken, A. Basu, V. Buch, and W. Vogels. U-Net: A User-Level Network Interface for Parallel and Distributed Computing. In Proceedings of the 15th ACM Symposium on Operating Systems Principles (SOSP), 1995.

T. Wenisch, R. Wunderlich, M. Ferdman, A. Ailamaki, B. Falsafi, and J. Hoe. SimFlex: Statistical Sampling of Computer System Simulation. IEEE Micro, 26:18-31, 2006.

WinterCorp. Big Data and Data Warehousing. http://www.wintercorp.com/.

K. A. Yelick, D. Bonachea, W.-Y. Chen, P. Colella, K. Datta, J. Duell, S. L. Graham, P. Hargrove, P. N. Hilfinger, P. Husbands, C. Iancu, A. Kamil, R. Nishtala, J. Su, M. L. Welcome, and T. Wen. Productivity and Performance Using Partitioned Global Address Space Languages. In Workshop on Parallel Symbolic Computation (PASCO), 2007.

SUMMARY OF THE INVENTION

In various embodiments of a computing system according to the present invention, remote memory requests through locally cache-coherent interactions are made using an on-chip architectural block that interfaces directly with an on-die network interface. This remote memory controller ("RMC") can be hardwired. Each operation handled by the RMC is converted into a set of stateless request/reply exchanges between two nodes. More complex operations can be built from a plurality of such exchanges.

In some embodiments, a minimal programming model is provided by the RMC, for one-sided memory operations that access a partitioned global address space. The model can be exposed through lightweight libraries that also implement communication and synchronization primitives in software. Using this approach, this "scale-out NUMA," or "soNUMA," can achieve latencies within a small factor of local DRAM access and can saturate available bandwidth.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which:

FIG. 4 is an illustrative example of a computer software process that may be used for asynchronous application programming interface in accordance with an example embodiment of the present disclosure;

DETAILED DESCRIPTION OF THE INVENTION

Figure 1:
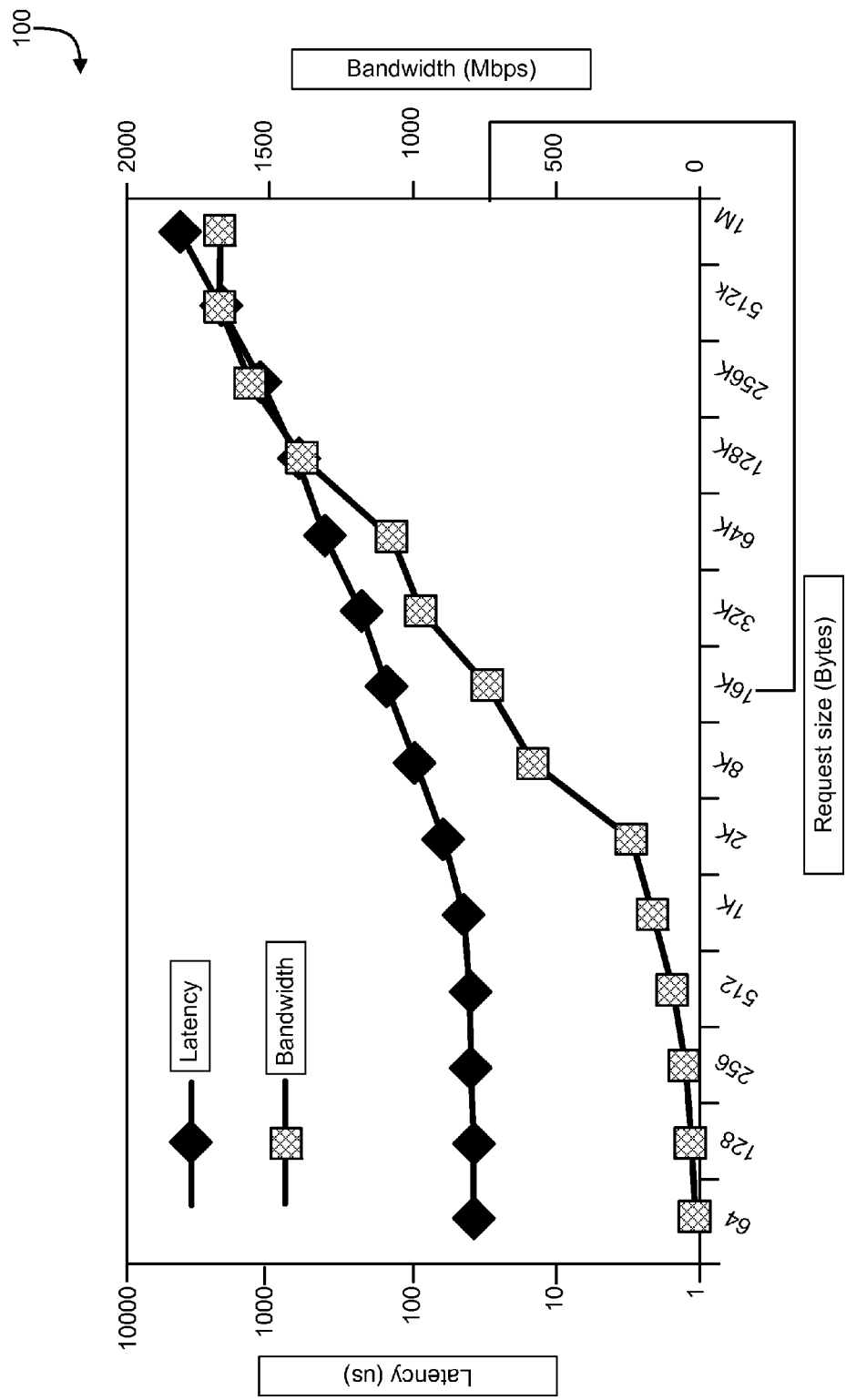
FIG. 1 is an illustrative example of a graph plotting network performance in accordance with example embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Today's massive web-scale applications, such as search or analytics, require thousands of computers and petabytes of storage. Increasingly, the trend has been toward deeper analysis and understanding of data in response to real-time queries. To minimize the latency, datacenter operators have shifted hot datasets from disk to DRAM, necessitating terabytes, if not petabytes, of DRAM distributed across a large number of servers.

The distributed nature of the data leads to frequent server-to-server interactions within the context of a given computation, e.g., rendering of a particular page for an online retailer might require access to more than 150 services. These interactions introduce significant latency overheads that constrain the practical extent of sharding (horizontal partitioning of databases) and the complexity of deployed algorithms.

Recent work examining sources of network latency overhead in datacenters found that a typical deployment based on commodity technologies may incur over 100 μs in round-trip latency between a pair of servers. According to one study, principal sources of latency overhead include the operating system stack, NIC, and intermediate network switches. While 100 μs may seem insignificant, many applications, including graph-based applications and those that rely on key-value stores, perform minimal computation per data item loaded. For example, read operations dominate key-value store traffic, and simply return the object in memory. With 1000× difference in data access latency between local DRAM (100 ns) and remote memory (100 μs), distributing the dataset, although necessary, incurs a dramatic performance overhead.

Today's datacenters employ commodity technologies in their server architectures and elsewhere, in part due to their favorable cost-performance characteristics. The end result is a "scale-out" architecture characterized by a large number of commodity servers connected via commodity networking equipment. Two architectural trends are emerging in scale-out designs.

First, System-on-Chips ("SoCs") provide high chip-level integration and are a major trend in servers. Current server SoCs combine many processing cores, memory interfaces, and I/O to reduce cost and improve overall efficiency by eliminating extra system components, e.g., Calxeda's® ECX-1000 SoC combines four ARM Cortex-A9 cores, memory controller, serial ATA ("SATA") interface, and a fabric switch into a compact die with a 5 Watt typical power draw.

Second, system integrators are starting to offer "glueless fabrics" that can seamlessly interconnect hundreds of server nodes into fat-tree or torus topologies. For instance, Calxeda's® on-chip fabric router encapsulates Ethernet frames while energy-efficient processors run the standard Transmission Control Protocol/Internet Protocol ("TCP/IP") and User Datagram Protocol/Internet Protocol ("UDP/IP") protocols as if they had a standard Ethernet NIC. The tight integration of NIC, routers and fabric leads to a reduction in the number of components in the system (thus lowering cost) and improves energy efficiency by minimizing the number of chip crossings. However, such glueless fabrics alone do not substantially reduce latency because of the high cost of protocol processing at the endpoints.

Remote direct memory access ("RDMA") enables memory-to-memory data transfers across the network without processor reliable connections directly to user-level applications, and RDMA eliminates all kernel overheads. Furthermore, one-sided remote memory operations are handled entirely by the adapter without interrupting the destination core. RDMA is supported on lossless fabrics, such as InfiniBand® and Converged Ethernet that scale to thousands of nodes and can offer remote memory read latency as low as 1.19 μs.

Although historically associated with the high-performance computing market, RDMA is now making inroads into web-scale data centers, such as Microsoft Bing®. Latency-sensitive key-value stores such as RAMCloud® and Pilaf® are using RDMA fabrics to achieve object access latencies of as low as 5 μs.

As datasets grow, the trend is toward more sophisticated algorithms at ever-tightening latency bounds. While SoCs, glueless fabrics, and RDMA technologies help lower network latencies, the network delay per byte loaded remains high.

There are many difficulties of further reducing the latency for in-memory applications, such as node scalability being power-limited. As voltage scaling grinds to a halt, future improvements in compute density at the chip level will be limited. Power limitations will extend beyond the processor, and impact the amount of DRAM that can be integrated in a given unit of volume (which governs the limits of power delivery and heat dissipation). Together, power constraints at the processor and DRAM levels will limit the server industry's ability to improve the performance and memory capacity of scale-up configurations, thus accelerating the trend toward distributed memory systems. Further difficulties come from the fact that deep network stacks are costly. Distributed systems rely on networks to communicate. Unfortunately, today's deep network stacks require a significant amount of processing per network packet, which factors considerably into end-to-end latency.

Techniques described and suggested herein introduce Scale-Out Non-Uniform Memory Access ("soNUMA"). Embodiments using soNUMA might include an architecture, a programming model, and a communication protocol for distributed, in-memory applications. For example, using soNUMA, remote memory access latency may be reduced to within a small factor (e.g., 3×, 4×, 5×) of local memory access.

Example embodiments of a soNUMA system provide an architecture, a programming model, and a communication protocol for low-latency, big-data processing. soNUMA eliminates the need for kernel, network stack, and input/output ("I/O") bus overheads by exposing a hardware block, the remote memory controller, within the cache-coherent hierarchy of the processor. The remote memory controller is directly accessible by applications and connects directly into a non-uniform memory access ("NUMA") fabric. Example embodiments describe methods and systems that disclose that soNUMA can achieve remote read latencies that are within 4× of local dynamic random-access memory ("DRAM") access, stream at full memory bandwidth, and issue up to 10M remote memory operations per second per core.

A system implementing soNUMA may leverage at least two constructs to minimize latency. The first construct is the use of a stateless request/reply protocol running over a NUMA memory fabric to drastically reduce or eliminate the network stack, complex network interface controller ("NIC"), and switch gear delays. The second construct is integrating the protocol controller into the node's local coherence hierarchy, thus avoiding state replication and data movement across the slow PCI Express ("PCIe") interface.

Example embodiments of a soNUMA system can expose the abstraction of a partitioned global virtual address space, which is useful, for example, for big-data applications with irregular data structures such as graphs. The programming model might be based on remote direct memory access ("RDMA") or something similar, with application threads making explicit remote memory read and write requests with copy semantics. The model is supported by an architecturally exposed hardware block, called the remote memory controller ("RMC"), which safely exposes the global address space to applications. The RMC is integrated into each node's coherence hierarchy, providing for a frictionless, low-latency interface between the processor, memory, and the interconnect fabric.

Embodiments of the present disclosure include a soNUMA emulation platform built using a hypervisor that runs applications at normal, wall-clock speeds and features remote latencies within 5× of what a hardware-assisted RMC should provide is disclosed.

In various embodiments of a computing system according to the present invention, remote memory requests through locally cache-coherent interactions are made using an on-chip architectural block that interfaces directly with an on-die network interface. This remote memory controller can be hardwired. Each operation handled by the RMC is converted into a set of stateless request/reply exchanges between two nodes. More complex operations can be built from a plurality of such exchanges.

In some embodiments, a minimal programming model is provided by the RMC, such as for one-sided memory operations that access a partitioned global address space. The model can be exposed through lightweight libraries that also implement communication and synchronization primitives in software. Using this approach, soNUMA can achieve latencies within a small factor of local DRAM access and can saturate available bandwidth.

FIG. 1 is an example embodiment of a graph 100 showing the network performance between two directly-connected system on chips ("SoCs"). More specifically, the graph 100 shows the network performance between two directly-connected Calxeda® EnergyCore ECX-1000 SoCs, measured using a standard network protocol independent performance evaluator ("NetPIPE") benchmark. The fabric and the integrated NICs provide 10 Gigabits per second ("Gbps") worth of bandwidth.

Despite the immediate proximity of the nodes and the lack of intermediate switches, there may be observed high latency (in excess of 40 µs) for small packet sizes and poor bandwidth scalability (under 2 Gbps) with large packets. These bottlenecks exist due to the high processing requirements of TCP/IP and are aggravated by the limited performance offered by ARM cores. As large-scale shared memory is prohibitive, one way to bypass complex network stacks is through direct access to shared physical memory. Unfortunately, large-scale sharing of physical memory is challenging for two reasons. First is the sheer cost and complexity of scaling up hardware coherence protocols. Chief bottlenecks here include state overhead, high bandwidth requirements, and verification complexity. The second is the fault-containment challenge of a single operating system instance managing a massive physical address space, whereby the failure of any one node can take down the entire system by corrupting shared state. Sharing caches even within the same socket can be expensive and partitioning a single many-core socket into multiple coherence domains improves the execution efficiency of scale-out workloads that do not have shared datasets.

Peripheral Component Interconnect Express ("PCIe") and direct memory access ("DMA") latencies limit performance. I/O bypass architectures have successfully removed most sources of latency except the PCIe bus. For example, it may take 400-500 ns to communicate short bursts over the PCIe bus, making such transfers 7-8× more expensive, in terms of latency, than local DRAM accesses. Furthermore, PCIe does not allow for the cache-coherent sharing of control structures between the system and the I/O device, leading to the need of replicating system state such as page tables into the device and system memory. In the latter case, the device memory serves as a cache, resulting in additional DMA transactions to access the state. SoC integration alone does not eliminate these overheads, since Internet protocol ("IP") blocks often use DMA internally to communicate with the main processor.

Both latency and cost of high-speed communication within a datacenter are severely impacted by distance. Latency is insignificant and bandwidth is cheap within a rack, enabling low-dimensional topologies (e.g., 3-D torus) with wide links and small signal propagation delays (e.g., 20 ns for a printed circuit board trace spanning a 44 U rack). Beyond a few meters, however, expensive optical transceivers must be used, and non-negotiable propagation delays (limited by the speed of light) quickly exceed DRAM access time. The combination of cost and delay puts a natural limit to the size of tightly interconnected systems.

Figure 2:
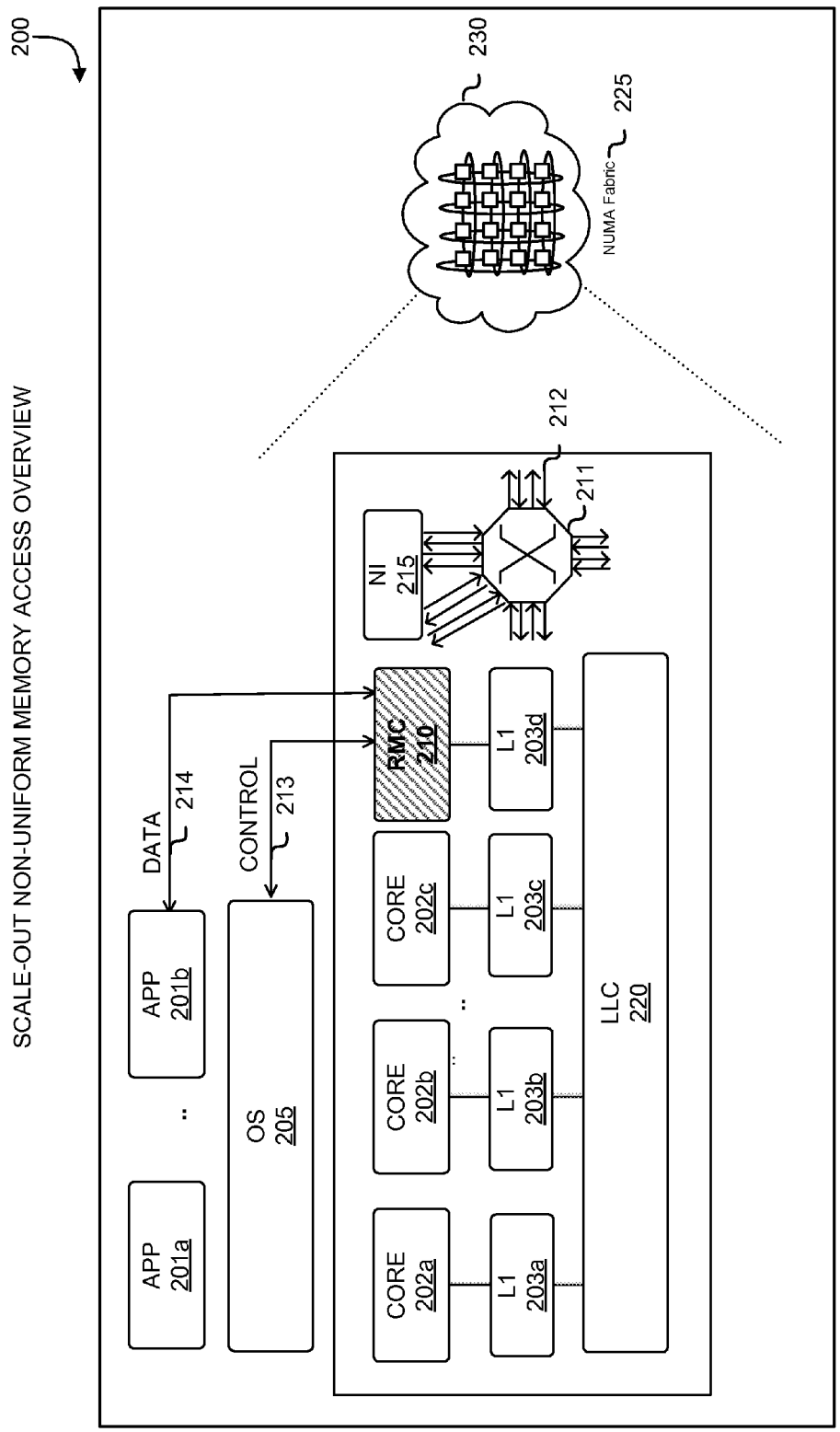
FIG. 2 is an illustrative example of a block diagram identifying various components of a scale-out non-uniform memory access system in accordance with example embodiments of the present disclosure.

FIG. 2 is an illustrative example of a block diagram 200 providing an overview of various components of a scale-out non-uniform memory access system in accordance with example embodiments of the present disclosure.

Example embodiments of a soNUMA system according to the present invention can provide an architecture and a programming model for low-latency distributed memory. The soNUMA system addresses each of the obstacles to low-latency described above. The soNUMA system can be designed for a scale-out model with physically distributed processing and memory: (i) it replaces deep network stacks with a lean memory fabric; (ii) eschews system-wide coherence in favor of a global partitioned virtual address space accessible via RMDA-like remote memory operations with copy semantics; (iii) replaces transfers over the slow PCIe bus with cheap cache-to-cache transfers; and (iv) is optimized for rack-scale deployments, where distance is minuscule.

At a high level, soNUMA combines a lean memory fabric with an RDMA-like programming model in a rack-scale system. Applications, such as APP 201a and APP 201b, access remote portions of the global virtual address space through remote memory operations. A new architecturally-exposed block, the remote memory controller ("RMC") 210, converts these operations into network transactions and directly performs the memory accesses. Applications directly communicate, including transmitting and receiving data 214, with the RMC, bypassing the operating system ("OS") 205, which gets involved only in setting up the necessary in-memory control data structures.

Unlike traditional implementations of RDMA, which operate over the peripheral component interconnect ("PCI") bus, the RMC benefits from a tight integration into the processor's cache-coherence hierarchy. In particular, the processor and the RMC share all data structures via the cache hierarchy. The implementation of the RMC is further simplified by limiting the architectural support to one-sided remote memory read, write, and atomic operations, and by unrolling multi-line requests at the source RMC. As a result, the protocol can be implemented in a stateless manner by the destination node.

According to the example embodiment of FIG. 2, the RMC 210 converts application commands 214 into remote requests that are transmitted to the network interface ("NI") 215. The NI 215 can be connected to an on-chip low-radix router, such as router 211, with reliable, point-to-point links 212 to other soNUMA nodes. The notion of fast low-radix routers borrows from supercomputer interconnects; for instance, the mesh fabric of the Alpha 21364 connected 128 nodes in a 2D torus using an on-chip router with a pin-to-pin delay of just 11 ns.

Further embodiments disclose that a system using soNUMA's memory fabric 225 can provide functionality to interconnect sockets together into multiple NUMA domains 230. In such fabrics, parallel transfers over traces minimize pin-to-pin delays, short messages (header+a payload of a single cache line) minimize buffering requirements, topology-based routing eliminates costly content-addressable memory ("CAM") or ternary CAM ("TCAM") lookups, and virtual lanes ensure deadlock freedom. Although FIG. 2 illustrates a 2D-torus, the design is not restricted to any particular topology.

Figure 3A:
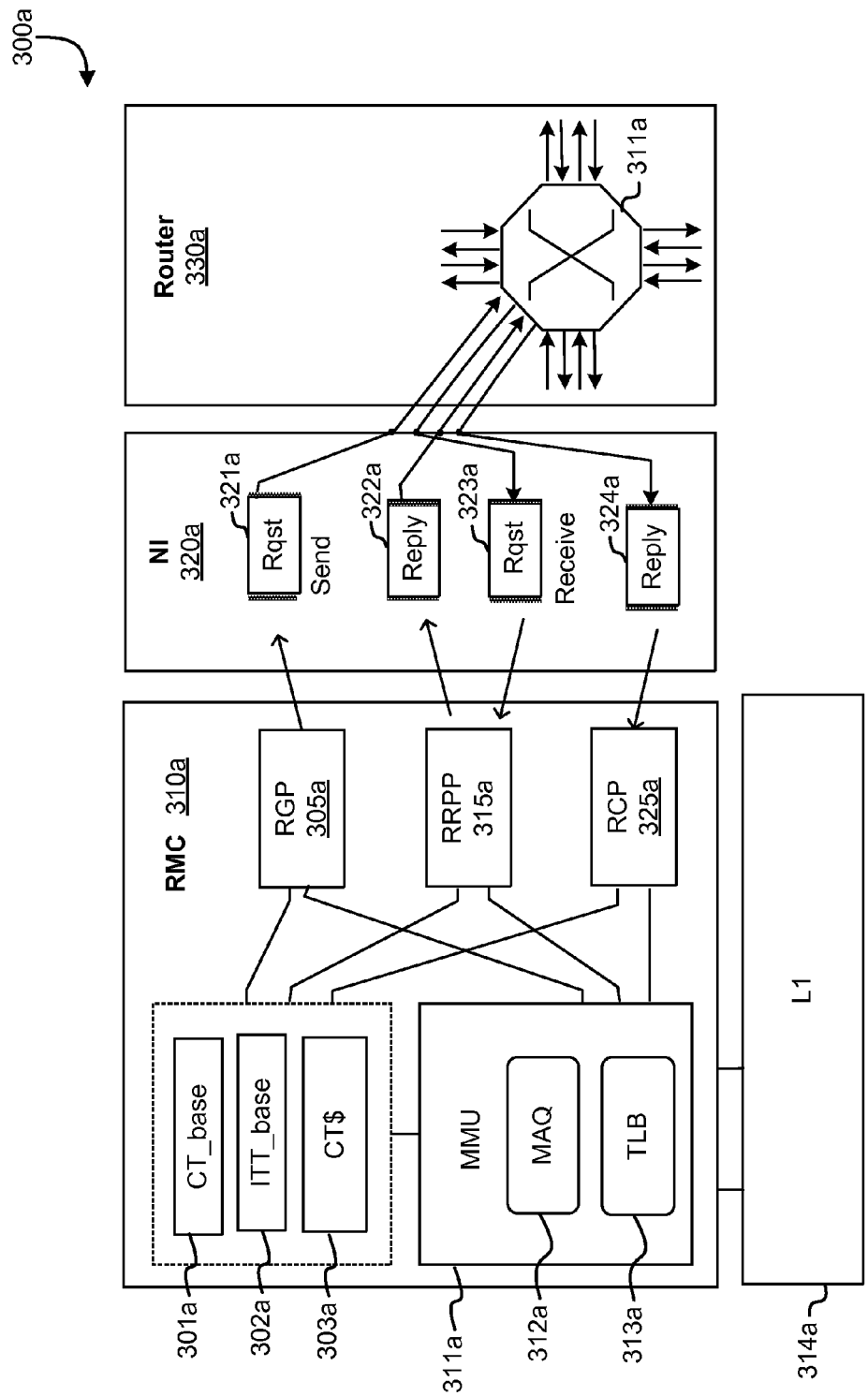
FIG. 3A is an illustrative example of an environment showing a high-level internal organization of a remote memory controller in accordance with an example embodiment of the present disclosure.

FIG. 3A is an illustrative example of an environment 300a showing a high-level internal organization of the remote memory controller ("RMC") in accordance with an example embodiment of the present disclosure.

A significant component of a soNUMA implementation is the RMC 310a, an architectural block that services remote memory accesses originating at the local node, as well as incoming requests from remote nodes. The RMC integrates into the processor's coherence hierarchy via a private L1 cache 314a and communicates with the application threads, such as applications 201a-b as described and depicted in connection with FIG. 2, via memory-mapped queues.

Example embodiments of soNUMA provide application nodes with the abstraction of globally addressable, virtual address spaces that can be accessed via explicit memory operations. The RMC exposes this abstraction to applications, allowing them to safely and directly copy data to/from global memory into a local buffer using remote write, read, and atomic operations, without kernel intervention. The interface offers atomicity guarantees at the cache-line granularity, and no ordering guarantees within or across requests.

Example embodiments of soNUMA's hardware/software interface is centered around four main abstractions directly exposed by the RMC: (i) the context identifier ("ctx_id"), which is used by all nodes participating in the same application to create a global address space; (ii) the context segment, a range of the node's address space which is globally accessible by others; (iii) the queue pair ("QP"), used by applications to schedule remote memory operations and get notified of their completion; and (iv) local buffers, which can be used as the source or destination of remote operations.

The QP model comprises a work queue ("WQ"), a bounded buffer written exclusively by the application, and a completion queue ("CQ"), a bounded buffer of the same size written exclusively by the RMC. The CQ entry contains the index of the completed WQ request. Both are stored in main memory and coherently cached by the cores and the RMC alike. In each operation, the remote address is specified by the combination of <node_id, ctx_id, offset>. Other parameters might include, for example, the length, the local buffer address, and the like.

In an implementation, the RMC 310a comprises three hardwired pipelines that interact with the queues exposed by the hardware/software interface and with the NI 320a. These pipelines are responsible for request generation 305a, remote request processing 315a, and request completion 325a, respectively. They are controlled by a configuration data structure, the Context Table ("CT") 301a, and leverage an internal structure, the Inflight Transaction Table ("ITT") 302a.

The CT is maintained in memory and is initialized by system software (as described below in connection with device drivers). The CT keeps track of all registered context segments, queue pairs, and page table root addresses. Each CT entry, indexed by its ctx_id, specifies the address space and a list of registered QPs (WQ, CQ) for that context. Multi-threaded processes can register multiple QPs for the same address space and ctx_id. Meanwhile, the ITT is used exclusively by the RMC 310a and keeps track of the progress of each WQ request.

The three pipelines are connected to distinct queues of the NI block 320a, which is itself connected to a low-radix router block 311a with support for two virtual lanes, although other embodiments may include more or less. While each of the three pipelines implements its own data path and control logic, all three share some common data structures and hardware components. For example, they arbitrate for access to the common L1 cache 314a, via the memory management unit ("MMU") 311a. As shown in the example embodiment of FIG. 3A, memory requests of the three pipelines access the cache via the MMU 311a. The CT_base register 301a, the ITT_base register 302a, and the CT$ 303a offer fast access to the basic control structures.

Figure 3B:
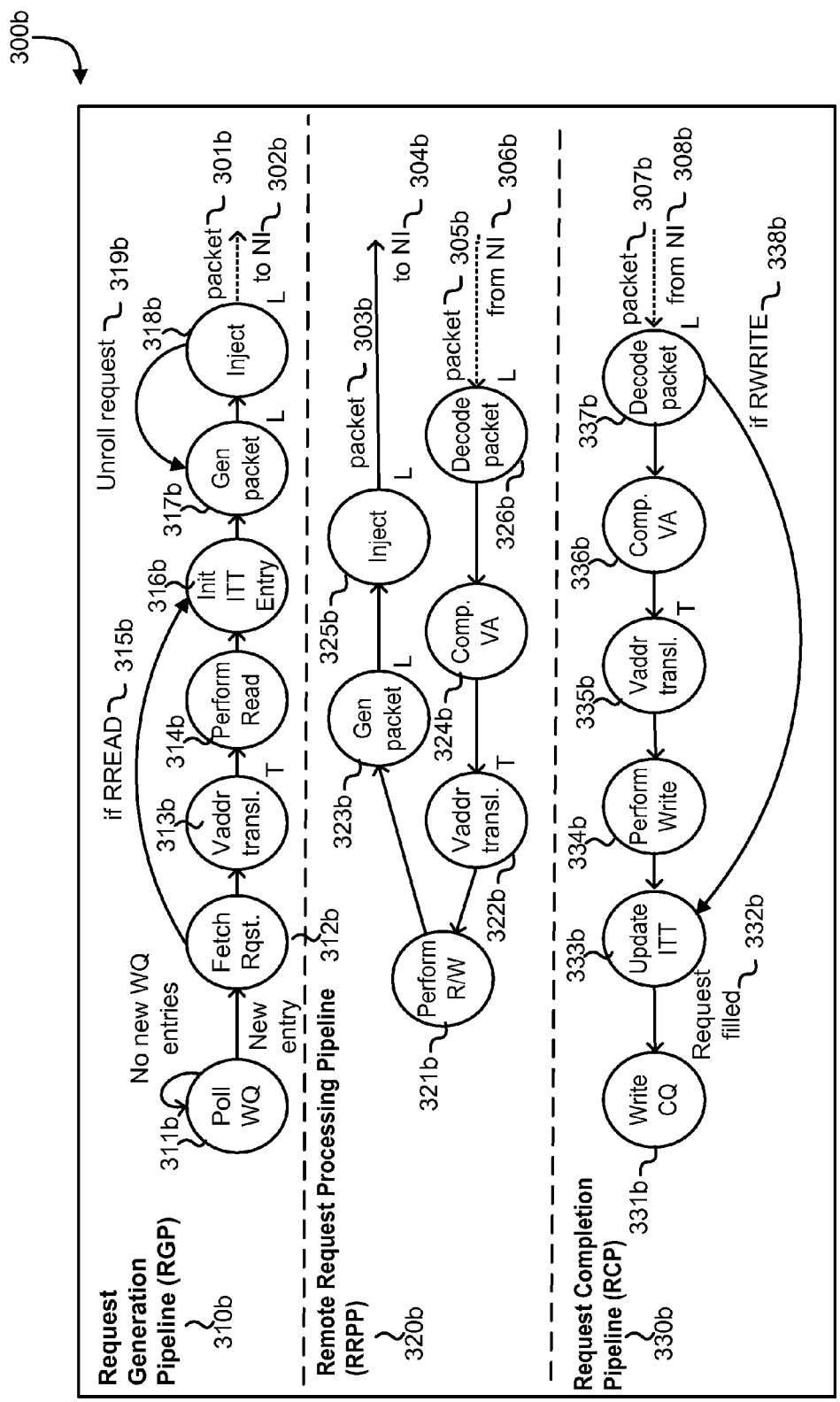
FIG. 3B is an illustrative example of a block diagram showing a functionality of a remote memory controller in accordance with an example embodiment of the present disclosure.

FIG. 3B is an illustrative example of a block diagram 300b showing a functionality of an RMC pipeline in accordance with an example embodiment of the present disclosure. FIG. 3B illustrates the interconnections between the RMC 310a and the NI 320a via pipelines from RGP 305a, RRPP 315a, and RCP 325a and the NI 320a; as such, reference to element numbers of FIG. 3A are similarly used below in the description of FIG. 3B.

As illustrated in FIG. 3B, states with an "L" next to them indicate local processing in combinational logic and "T" indicates translation lookaside buffer ("TLB") access. The rest of the states can access memory via the MMU. FIG. 3B highlights the main states and transitions for the three independent pipelines. Each pipeline can have multiple transactions in flight. Most transitions require an MMU access, which may be retried in any order. Therefore, transactions will be reordered as they flow through a pipeline; however, other orderings are possible according to the present disclosure.

FIG. 3B illustrates an example of a first independent pipeline, the request generation pipeline ("RGP") 310b (as illustrated in FIG. 3A, 305a and 321a). The RMC initiates remote memory access transactions in response to an application's remote memory requests (reads, writes, atomics). To detect such requests, the RMC polls on each registered WQ 311b. Upon a new WQ request 312b, the RMC generates one or more network packets 317b using the information in the WQ entry. For remote writes and atomic operations, the RMC accesses the local node's memory to read the required data 314b, which it then encapsulates into the generated packet(s) 301b. For each request, the RMC generates 316b a transfer identifier ("tid") that allows the source RMC to associate replies with requests. Remote transactions in soNUMA may operate at cache-line granularity. Coarser granularities, in cache-line-sized multiples, can be specified by the application via the length field in the WQ request. The RMC unrolls multi-line requests 319b in hardware, generating a sequence of line-sized read or write transactions. To perform unrolling 319b, the RMC can use the ITT 316b, which tracks the number of completed cache-line transactions for each WQ request and is indexed by the request's tid.

FIG. 3B further illustrates an example of a second independent pipeline, a remote request processing pipeline ("RRPP") 320b. This pipeline handles incoming requests, such as packet 305b, originating from remote RMCs and coming from NI 306b (as illustrated in FIG. 3A, 323a, 315a, 322a). The soNUMA protocol is stateless, which means that the RRPP 320b can process remote requests using only the values in the header and the local configuration state 326b. Specifically, the RRPP uses the ctx_id to access the CT, computes the virtual address 324b, translates it to the corresponding physical address 322b, and then performs a read, write, or atomic operation 321b as specified in the request. The RRPP always completes by generating a reply message 323b, which is sent to the source 325b; in other words, the packet 303b, generated during the process 323b, is transmitted back to NI 304b. Virtual addresses that fall outside of the range of the specified security context are signaled through an error message, which is propagated to the offending thread in a special reply packet and delivered to the application via the CQ.

FIG. 3B further illustrates an example of a third independent pipeline, a request completion pipeline ("RCP") 330b. This pipeline handles incoming message replies, such as a packet 307b received from NI 308b (as illustrated in FIG. 3A, 324a and 325a). The RMC extracts the tid and uses it to identify the originating WQ entry 326b. For reads and atomics, the RMC then stores the payload into the application's memory at the virtual address 335b specified in the request's WQ entry. For multi-line requests, the RMC computes the target virtual address 336b based on the buffer base address specified in the WQ entry and the offset specified in the reply message. The ITT can track the number of completed cache-line requests 333b. Once the last reply is processed, the RMC signals the request's completion by writing the index of the completed WQ entry into the corresponding CQ and moving the CQ head pointer 331b. Requests can therefore complete out of order and, when they do, are processed out of order by the application. Remote write acknowledgments are processed similarly to read completions, although remote writes naturally do not require an update of the application's memory at the source node.

In certain embodiments, the RMC implements the logic described above, in connection with FIGS. 3A and 3B, using a set of completely decoupled pipelines, affording concurrency in the handling of different functions at low area and design cost. In some implementations, the RMC features two separate interfaces: a coherent memory interface to a private L1 cache and a network interface to the on-die router providing system-level connectivity. The memory interface block ("MMU") contains a TLB for fast access to recent address translations, required for all accesses to application data. TLB entries are tagged with address space identifiers corresponding to the application context. TLB misses are serviced by a hardware page walker. The RMC provides two interfaces to the L1 cache: a conventional word-wide interface and a cache-line-wide interface. The former is used to interact with the application and to perform atomic memory operations. The latter enables efficient atomic reads and writes of entire cache lines, which is the granularity of remote memory accesses in soNUMA.

By integrating the RMC into the node's coherence hierarchy, soNUMA eliminates or reduces wasteful data copying of control structures, and of page tables in particular. It also reduces the latency of the application/RMC interface by eliminating the need to set up DMA transfers of ring buffer fragments. To further ensure high throughput and low latency at high load, the RMC allows multiple concurrent memory accesses in flight via a Memory Access Queue ("MAQ"). The MAQ handles memory read and write operations, including accesses to application data, WQ and CQ interactions, page table walks, as well as ITT and CT accesses. The number of outstanding operations is limited by the number of miss status handling registers at the RMC's L1 cache. The MAQ supports out-of-order completion of memory accesses and provides store-to-load forwarding.

Each pipeline has its own arbiter that serializes the memory access requests from the pipeline's several stages and forwards the requests to the MAQ. The latter keeps track of each request's originating arbiter, and responds to that once the memory access is completed. Upon such a response, the arbiter feeds the data to the corresponding pipeline stage.

Finally, the RMC dedicates two registers for the CT and ITT base addresses, as well as a small lookaside structure, the CT cache ("CT$") that caches recently accessed CT entries to reduce pressure on the MAQ. The CT$ includes the context segment base addresses and bounds, PT roots, and the queue addresses, including the queues' head and tail indices. The base address registers and the CT$ are read-only-shared by the various RMC pipeline stages.

Further example embodiments presented herein disclose the system and application software support that exposes the RMC to applications and enables aspects of the soNUMA programming model.

One role of the operating system on a soNUMA node is to establish the global virtual address spaces. This includes the management of the context namespace, virtual memory, QP registration, etc. The RMC device driver manages the RMC itself, responds to application requests, and interacts with the virtual memory subsystem to allocate and pin pages in physical memory. The RMC device driver is also responsible for allocating the CT and ITT on behalf of the RMC.

Unlike a traditional RDMA NIC, the RMC has direct access to the page tables managed by the operating system, leveraging the ability to share cache-coherent data structures. As a result, the RMC and the application both operate using virtual addresses of the application's process once the data structures have been initialized.

The RMC device driver can implement a simple security model in which access control is granted on a per ctx_id basis. To join a global address space <ctx_>, a process first opens the device /dev/rmc_contexts/<ctx_>, which is successful when the user has appropriate permissions. All subsequent interactions with the operating system are done by issuing ioctl calls via the previously opened file descriptor. In effect, a soNUMA system may rely on the built-in operating system mechanism for access control when opening the context, and further assumes that all operating system instances of a soNUMA fabric are under a single administrative domain. Finally, the RMC notifies the driver of failures within the soNUMA fabric, including the loss of links and nodes. Such transitions typically require a reset of the RMC's state, and may require a restart of the applications.

Further example embodiments disclose that the QPs can be accessed via a lightweight application programming interface ("API") that might be in the form of a set of C/C++ inline functions that issue remote memory commands and synchronize by polling the completion queue. The API might include both synchronous (blocking) and asynchronous (non-blocking) sets of functions for both reads and writes. The asynchronous API could implement functionality similar to that of the Split-C programming model.

FIG. 4 is an illustrative example of a computer software process 400 that may be used for the asynchronous application programming interface for the implementation of the classic Page-Rank graph algorithm in accordance with an example embodiment of the present disclosure.

The method rmc_wait_for_slot processes CQ events (calling pagerank_async for all completed slots) until the head of the WQ is free. It then returns the freed slot where the next entry will be scheduled. The method rmc_read_async (similar to Split-C's get) requests a copy of a remote vertex into a local buffer. Finally, the method rmc_drain_cq waits until all outstanding remote operations have completed while performing the remaining callbacks.

The software process of the example embodiment of FIG. 4 can be performed by any of the computing systems or servers presented herein. The process further discloses that (i) the callback (pagerank_async) does not require a dedicated execution context, but instead is called directly within the main thread; (ii) when the callback is an inline function, it is passed as an argument to another inline function (rmc_wait_for_slot), thereby enabling compilers to generate optimized code without any function calls in the inner loop; (iii) when the algorithm has no read dependencies (as is the case here), asynchronous remote memory accesses can be fully pipelined to hide their latency, thereby showing efficiency.

The example embodiment of soNUMA's programming model as depicted in FIG. 4 combines true shared memory (by the threads running within a cache-coherent node) with explicit remote memory operations (when accessing data across nodes). In the Page-Rank example, the is_local flag determines the appropriate course of action to separate intra-node accesses (where the memory hierarchy ensures cache-coherence) from inter-node accesses (which are explicit). The RMC access library exposes atomic operations, such as compare-and-swap and fetch-and-add as inline functions, and in some example embodiments, these operations are executed atomically within the local cache-coherence hierarchy of the destination node.

By providing architectural support for only read, write, and atomic operations, a soNUMA system can reduce hardware cost and complexity. The minimal set of architecturally supported operations is not a limitation, however, as many standard communication and synchronization primitives can be built in software on top of these three basic primitives. In contrast, RDMA provides hardware support (in adapters) for unsolicited send and receive messages on top of reliable connections, thus introducing significant complexity (e.g., per-connection state) into the design.

Further example embodiments disclose two application instances which, in order to communicate using send and receive operations, first each application instance allocates a bounded buffer from its own portion of the global virtual address space. Normally, the sender always writes to the peer's buffer using rmc_write operations, and the content is read locally from cached memory by the receiver. Each buffer is an array of cache-line sized structures that contain header information (such as the length, memory location, and flow-control acknowledgements), as well as an optional payload. Flow-control is implemented via a credit scheme that piggybacks existing communication.

For small messages, the sender creates packets of predefined size, each carrying a portion of the message content as part of the payload. It then pushes the packets into the peer's buffer. To receive a message, the receiver polls on the local buffer. In the common case, the send operation requires a single rmc_write, and it returns without requiring any implicit synchronization between the peers. A similar messaging approach based on remote writes outperforms the default send/receive primitives of InfiniBand.

For large messages stored within a registered global address space, the sender only need provide the base address and size to the receiver's bounded buffer. The receiver then pulls the content using a single rmc_read and acknowledges the completion by writing a zero-length message into the sender's bounded buffer. This approach delivers a direct memory-to-memory communication solution, but requires synchronization between the peers.

At compile time, the user can define the boundary between the two mechanisms by setting a minimal message-size threshold: A "push" mechanism has lower latency since small messages complete through a single rmc.write operation and also allows for decoupled operations. The "pull" mechanism leads to higher bandwidth since it eliminates the intermediate packetization and copy step.

Further example embodiments disclose barrier synchronization, which may include a simple barrier primitive such that nodes sharing a ctx_id can synchronize. Each participating node broadcasts the arrival at a barrier by issuing a write to an agreed upon offset on each of its peers. The nodes then poll locally until all of them reach the barrier.

Example embodiments further include a communication protocol. The soNUMA's communication protocol naturally follows the design choices of the three RMC pipelines at the protocol layer. At the link and routing layers, example embodiments may include using existing memory fabric architectures to minimize pin-to-pin delays.

Some embodiments disclose a link layer. The memory fabric delivers messages reliably over high-speed point-to-point links with credit-based flow control. The message MTU is large enough to support a fixed-size header and an optional cache-line-sized payload. Each point-to-point physical link has two virtual lanes to support deadlock-free request/reply protocols. Further embodiments disclose a routing layer. The routing-layer header contains the destination and source address of the nodes in the fabric (<dst_nid, src_nid>). dst_nid is used for routing, and src_nid to generate the reply packet. The router's forwarding logic directly maps destination addresses to outgoing router ports, eliminating expensive CAM or TCAM lookups found in networking fabrics. While the actual choice of topology depends on system specifics, low-dimensional k-ary n-cubes (e.g., 3D torii) seem well-matched to rack-scale deployments. Further embodiments disclose a protocol layer. The RMC protocol is a simple request-reply protocol, with exactly one reply message generated for each request. The WQ entry specifies the dst_nid, the command (e.g., read, write, or atomic), the offset, the length and the local buffer address. The RMC copies the dst_nid into the routing header, determines the ctx_id associated with the WQ, and generates the tid. The tid serves as an index into the ITT and allows the source RMC to map each reply message to a WQ and the corresponding WQ entry. The tid is opaque to the destination node, but is transferred from the request to the associated reply packet.

Figure 5:
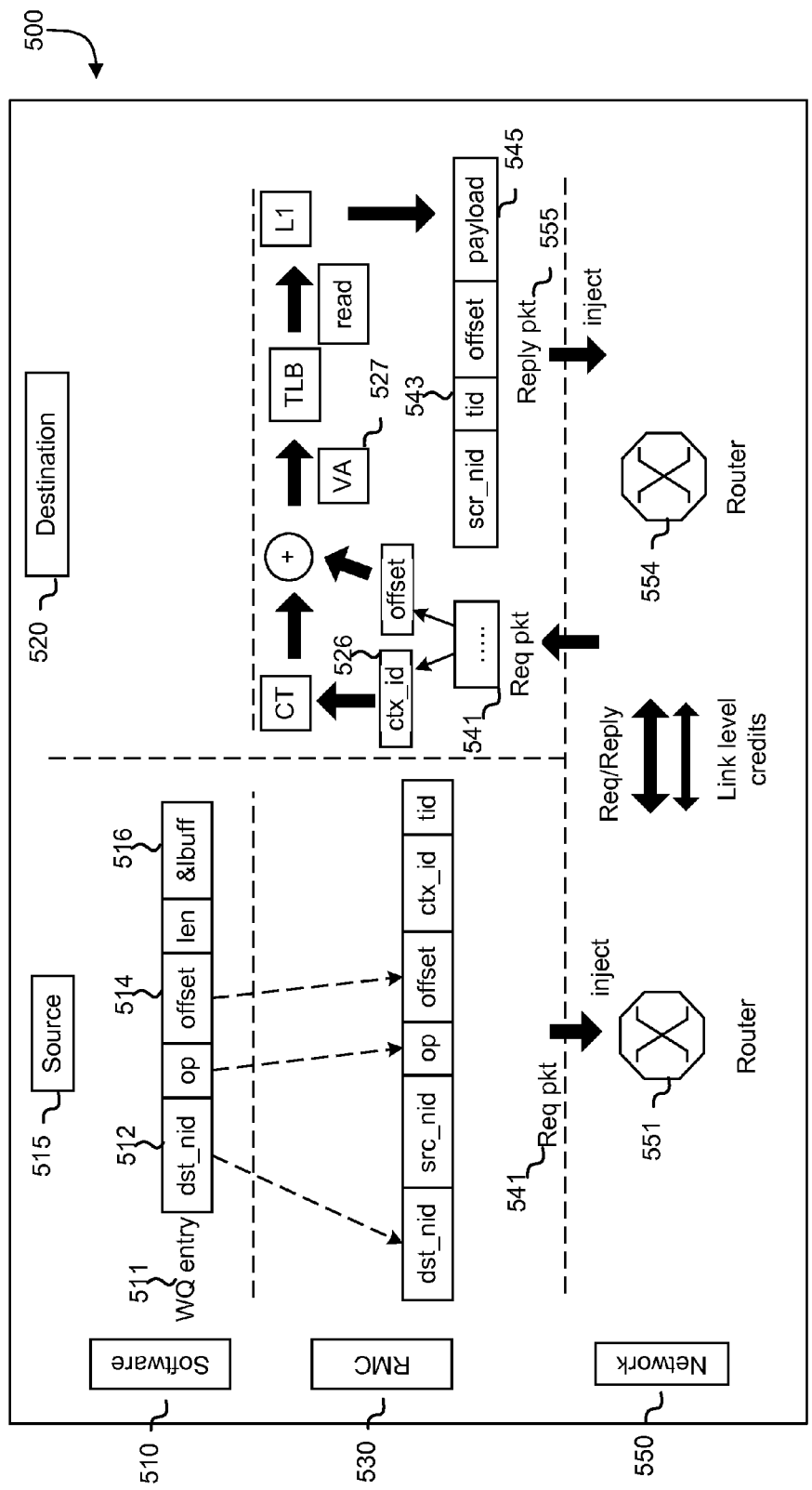
FIG. 5 is an illustrative example of a block diagram that shows a communication protocol in accordance with an example embodiment of the present disclosure.

FIG. 5 is an illustrative example of a block diagram 500 that shows a communication protocol for a remote read of a single cache-line in accordance with an example embodiment of the present disclosure.

FIG. 5 illustrates the actions taken by the RMCs 530 for a remote read of a single cache-line. The RGP in the requesting side's 515 RMC first assigns a tid 543 for the WQ entry 511 and the ctx_id 526 corresponding to that WQ. The RMC specifies the destination node 520 via a dst_nid field 512. The request packet 541 is then injected into the fabric and the packet is delivered to the target node's RMC via a router, such as routers 551 or 554 via a network 550. The receiving RMC's RRPP decodes the packet, computes the local virtual address 527 using the ctx_id 526 and the offset 514 found in it and translates that virtual address to a physical address. In some example embodiments, this stateless handling does not require any software 510 interaction on the destination node. As soon as the request is completed in the remote node's memory hierarchy, its RMC creates a reply packet 555 and sends it back to the requesting (source) node. Once the reply arrives to the original requester, the RMC's RCP completes the transaction by writing the payload 545 into the corresponding local buffer 516 and by notifying the application via a CQ entry (not shown).

Further example embodiments include two platforms: (i) a development platform—including soNUMA software based on virtual machines used to debug the protocol stack, formalize the API, and develop large-scale applications; and (ii) a cycle-accurate model—a full-system simulation platform modeling the proposed RMC.

An example soNUMA system may be based on the Xen hypervisor and a conventional cache-coherent-NUMA ("ccNUMA") server, on top of which is mapped (pinned) multiple virtual machines to distinct NUMA domains. This includes both virtual central processing units ("CPUs") and memory page frames. The server may be a modern AMD Opteron server with 4 CPU sockets (12 cores each, three-level cache hierarchy, 16 MB LLC) and 256 GB of random-access memory ("RAM"). The memory subsystem provides 8 NUMA domains (2 per socket). However, a person of skill in the art will recognize that any relevant server may be used according to example embodiments presented herein.

Figure 6:
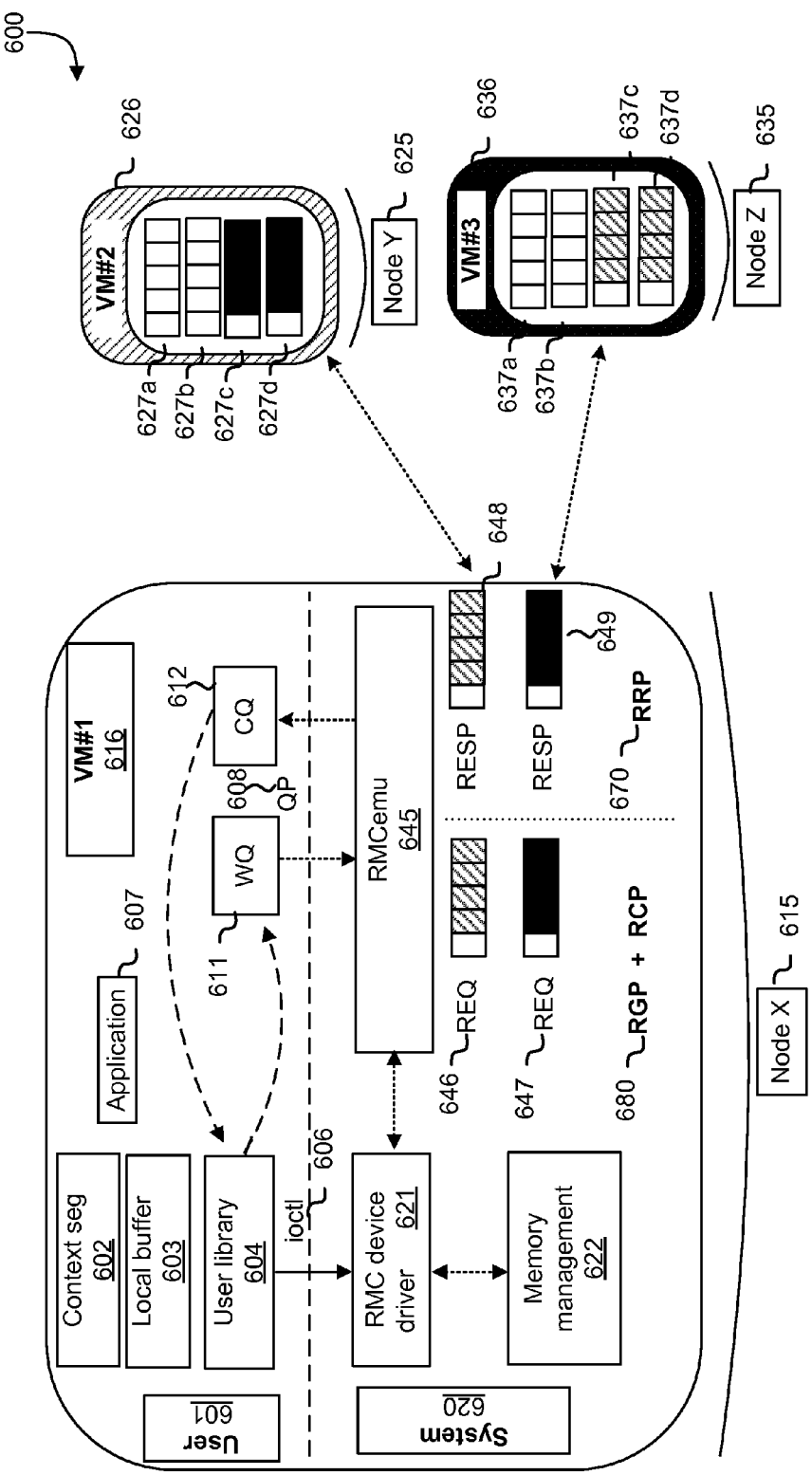
FIG. 6 is an illustrative example of an environment showing a scale-out non-uniform memory access development platform in accordance with an example embodiment of the present disclosure.

FIG. 6 is an illustrative example of an environment 600 showing a scale-out non-uniform memory access development platform using three nodes in accordance with an example embodiment of the present disclosure.

FIG. 6 illustrates an example virtual machine ("VM") implementation. Each individual VM 616, 626, and 636, represents an independent soNUMA node, running an instance of the full software stack. The stack includes all user-space libraries 604, applications 607, the OS kernel, as well as the complete RMC device driver 621 inside it. The driver may be a Linux kernel module that responds to user library commands through ioctl 606, enabling WQ 611/CQ 612 registration, buffer management for local buffer 603, and security context registration.

In the example embodiment of this platform, an RMC emulation module ("RMCemu") 645, which may run in kernel space, is implemented. The RMCemu 645 implements the RMC logic and the soNUMA wire protocol (for a total of 3100LOC). The module exposes the hardware/software interface, described in connection with FIGS. 3A and 3B above, to the RMC device driver and applications. RMCemu runs as a pair of kernel threads pinned to dedicated virtual CPUs, one running RGP and RCP, the other RRPP as described and depicted in connection with FIG. 3B. All of the user-level data structures and buffers may be memory-mapped by the device driver into the kernel virtual address space at registration time, and thus become visible to the RMCemu threads. Alternative example embodiments provide for the user-level structures and buffers to be memory-mapped by other software devices at different times in the process.

A full crossbar may be emulated and the communication protocol described in connection with FIG. 4 may be run. Each pair of nodes exchanges protocol request/reply messages via a set of queues, 646, 647, 648, 649, 627a-d, and 637a-d, mapped via the hypervisor into the guest physical address spaces of the VMs (there are two queue pairs per VM pair, emulating virtual lanes). To model the distributed nature of a soNUMA system, each emulated node, Node X 615, Node Y 625, and Node Z 635, is pinned to a distinct NUMA domain such that every message traverses one of the server's chip-to-chip links. However, for the 16-node configuration, two VMs are collocated per NUMA domain.

TABLE 1

System parameters for simulation on Flexus

| Parameter | Value(s) |
|---|---|
| Core | ARM Cortex-A15-like; 64-bit, 2 GHz, OoO, 3-wide dispatch/retirement, 60-entry ROB |
| L1 Caches | split I/D, 32 KB 2-way, 64-byte blocks, 2 ports, 32 MSHRs, 3-cycle latency (tag + data) |
| L2 Cache | 4 MB, 2 banks, 16-way, 6-cycle latency |
| Memory | cycle-accurate model using DRAM Sim2. 4 GB, 8 KB pages, single DDR3-1600 channel. DRAM latency: 60 ns; bandwidth: 12 Gbps |
| RMC | 3 independent pipelines (RGP, RCP, RRPP). 32-entry MAQ, 32-entry TLB |
| Fabric | Inter-node delay: 50 ns |

Table 1 shows parameters to be used as part of a cycle-accurate model used to assess the performance implications of the RMC using a Flexus full-system simulator, which includes timing models of cores, caches, on-chip protocol controllers, and interconnect. In the example embodiment of Table 1, the simulator models the SPARC v9 ISA and runs unmodified operating systems and applications. In its detailed OoO timing mode with the RMCs implemented, the simulator simulates "only" 5000 instructions per second, a slowdown of about six orders of magnitude compared to real hardware.

Simple nodes are modeled, each featuring a 64-bit ARM Cortex-A15-like core and an RMC. The system parameters are summarized in Table 1. A detailed timing model of the RMC, based on the micro-architectural description disclosed above in connection with FIGS. 3A-3B, is used to extend the simulator. In such example embodiments, the RMC and its private L1 cache are fully integrated into the node's coherence domain. Like the cores, the RMC supports 32 memory accesses in flight. FIG. 3B illustrates how the logic is modeled as a set of finite state machines that operate as pipelines and eliminate the need for any software processing within the RMC. A full crossbar with reliable links between RMCs and a flat latency of 50 ns is modeled in the instant embodiment.

The instant embodiment includes the performance of remote read operations between two nodes for both the development platform and the Flexus-based simulated hardware platform (being measured first). The microbenchmark issues a sequence of read requests of varying size to a pre-allocated buffer in remote memory. The buffer size exceeds the last level caches ("LLC") capacity in both setups. The instant embodiment includes performances being measured: (i) remote read latency with synchronous operations, whereby the issuing core spins after each read request until the reply is received, and (ii) throughput using asynchronous reads, where the issuing core generates a number of non-blocking read requests before processing the replies (similar to the process described and depicted in connection with FIG. 4).

Figure 7A:
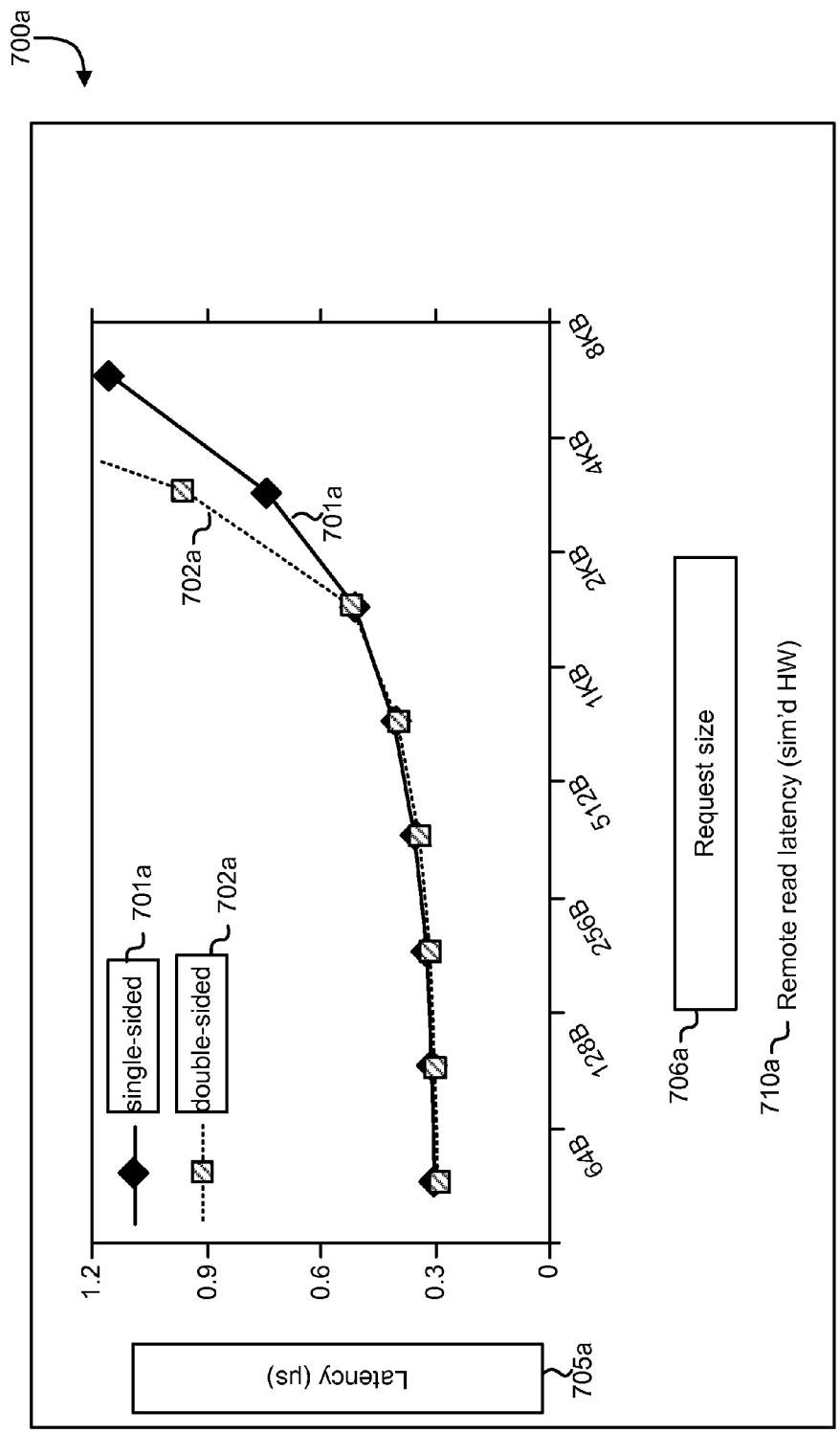
FIG. 7A shows an illustrated example of a graph plotting the latency and bandwidth of a remote read operation on a simulated hardware platform in accordance with various embodiments of the present disclosure.

FIG. 7A shows an illustrated example of a graph 700a plotting the latency and bandwidth of a remote read operation on a simulated hardware platform in accordance with various embodiments of the present disclosure.

FIG. 7A plots the latency 705a and bandwidth of remote read operations. The graph includes running the microbenchmark in both single-sided 701a (only one node reads) and double-sided 702a (both nodes read from each other) mode, for simplicity, only show the latency graph on the emulation side. FIG. 7A shows the remote read latency on the simulated hardware 710a as a function of the request size 706a. For small request sizes, the latency is around 300 ns, of which 80 ns are attributed to accessing the memory (cache hierarchy and DRAM combined) at the remote node and 100 ns to round-trip socket-to-socket link latency. The end-to-end latency is within a factor of 4 of the local DRAM access latency. In the double-sided mode, in some example embodiments, the average latency increases for larger message sizes as compared to the single-sided case. The reason for the drop is cache contention, as each node now has to both service remote read requests and write back the reply data.

Figure 7B:
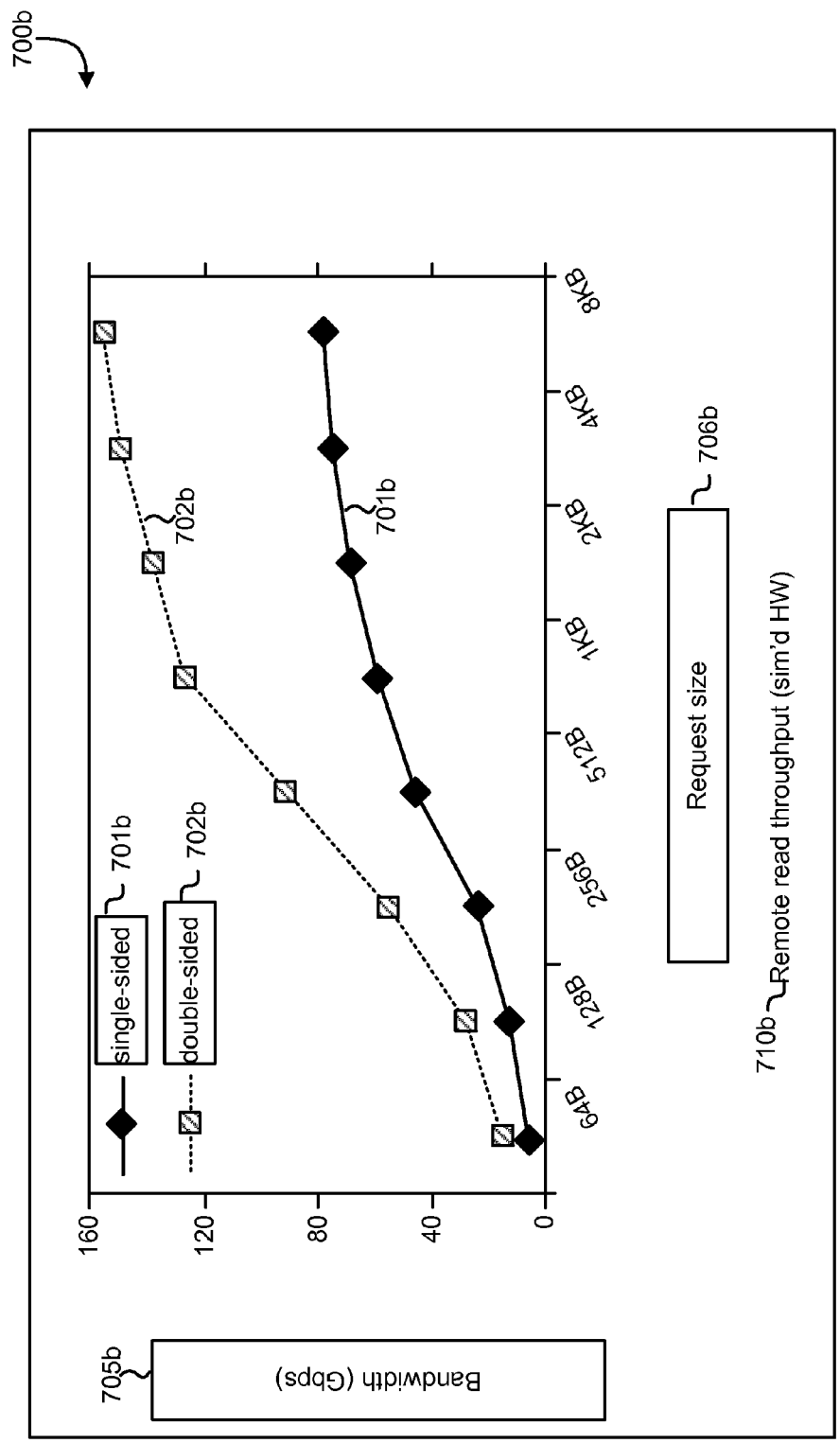
FIG. 7B shows an illustrated example of a graph plotting the bandwidth of a remote read operation on a simulated hardware platform in accordance with various embodiments of the present disclosure.

FIG. 7B shows an illustrated example of a graph 700b plotting the bandwidth of a remote read operation on a simulated hardware platform in accordance with various embodiments of the present disclosure. FIG. 7B plots bandwidth 705b between two simulated soNUMA nodes using asynchronous remote reads. For 64 B requests, for example, 10 M operations per second can be issued. For page-sized requests (8 KB), 9.6 Gbps, which is the practical maximum for a DDR3-1600 memory channel, is reached. Based on the example embodiment depicted in FIG. 7B, which included soNUMA nodes with decoupled pipelines of the RMC, the double-sided 702b test delivers twice the single-sided 701b bandwidth as shown in graph 700b.

Figure 7C:
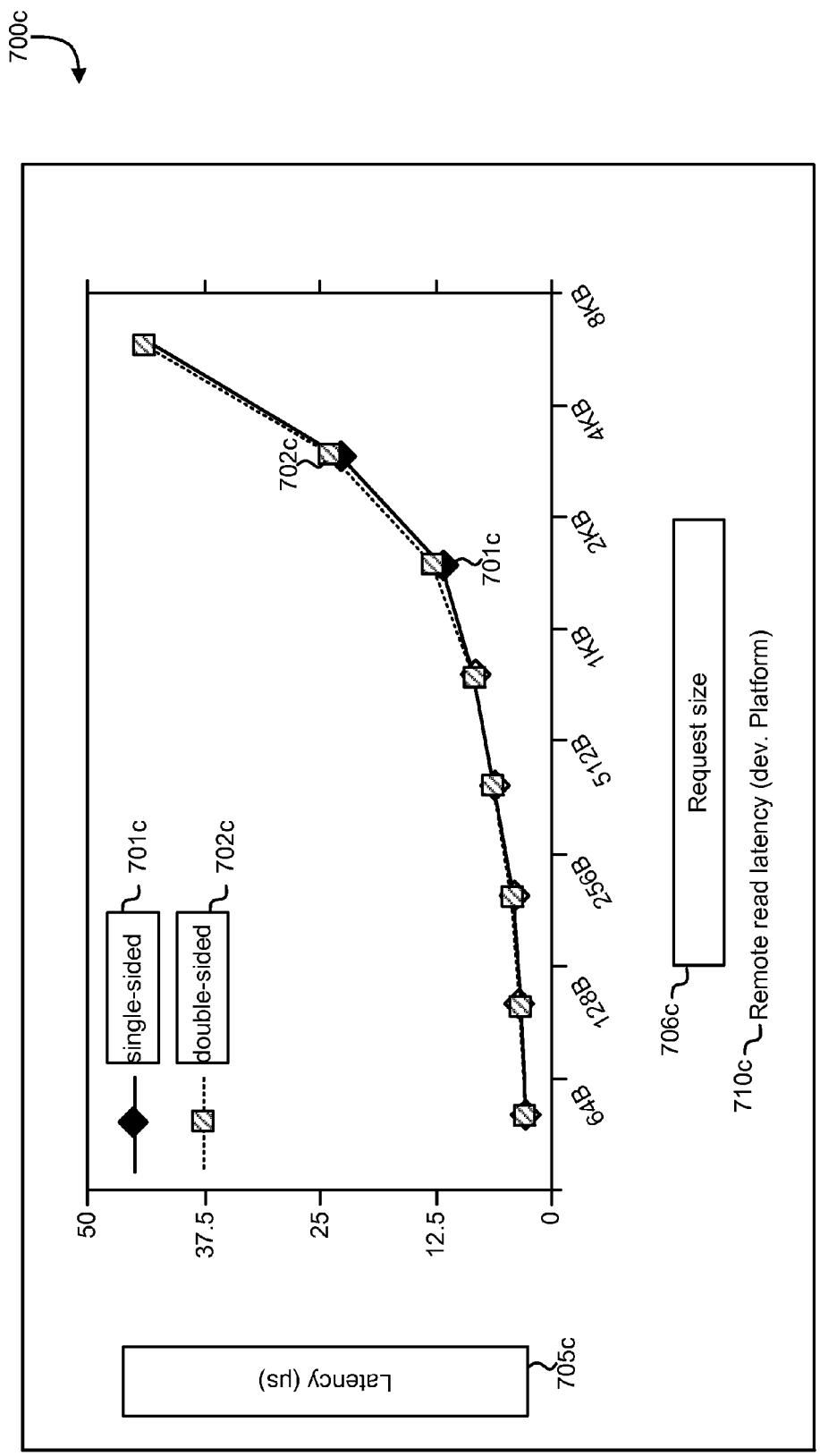
FIG. 7C shows an illustrated example of a graph plotting the latency performance of a remote read operation on a development platform in accordance with various embodiments of the present disclosure.

FIG. 7C shows an illustrated example of a graph 700c plotting the latency performance of a remote read operation on a development platform 710c in accordance with various embodiments of the present disclosure. FIG. 7C shows the latency results on the development platform. The baseline latency is 1.5 μs, which is 5× the latency on the simulated hardware. In some example embodiments of the development platform test, the latency 705c increases substantially with larger request sizes 706c. On the development platform, the RMC emulation module becomes the performance bottleneck as it unrolls large WQ requests into cache-line-sized requests.

An example embodiment according to the present invention includes a NetPIPE microbenchmark designed to evaluate the performance of the soNUMA unsolicited communication primitives, implemented entirely in software as described in connection with FIG. 4. The microbenchmark comprises the following two components: (i) a ping-pong loop that uses the smallest message size to determine the end-to-end one-way latency and (ii) a streaming experiment where one node is sending and the other is receiving data to determine bandwidth.

Figure 8A:
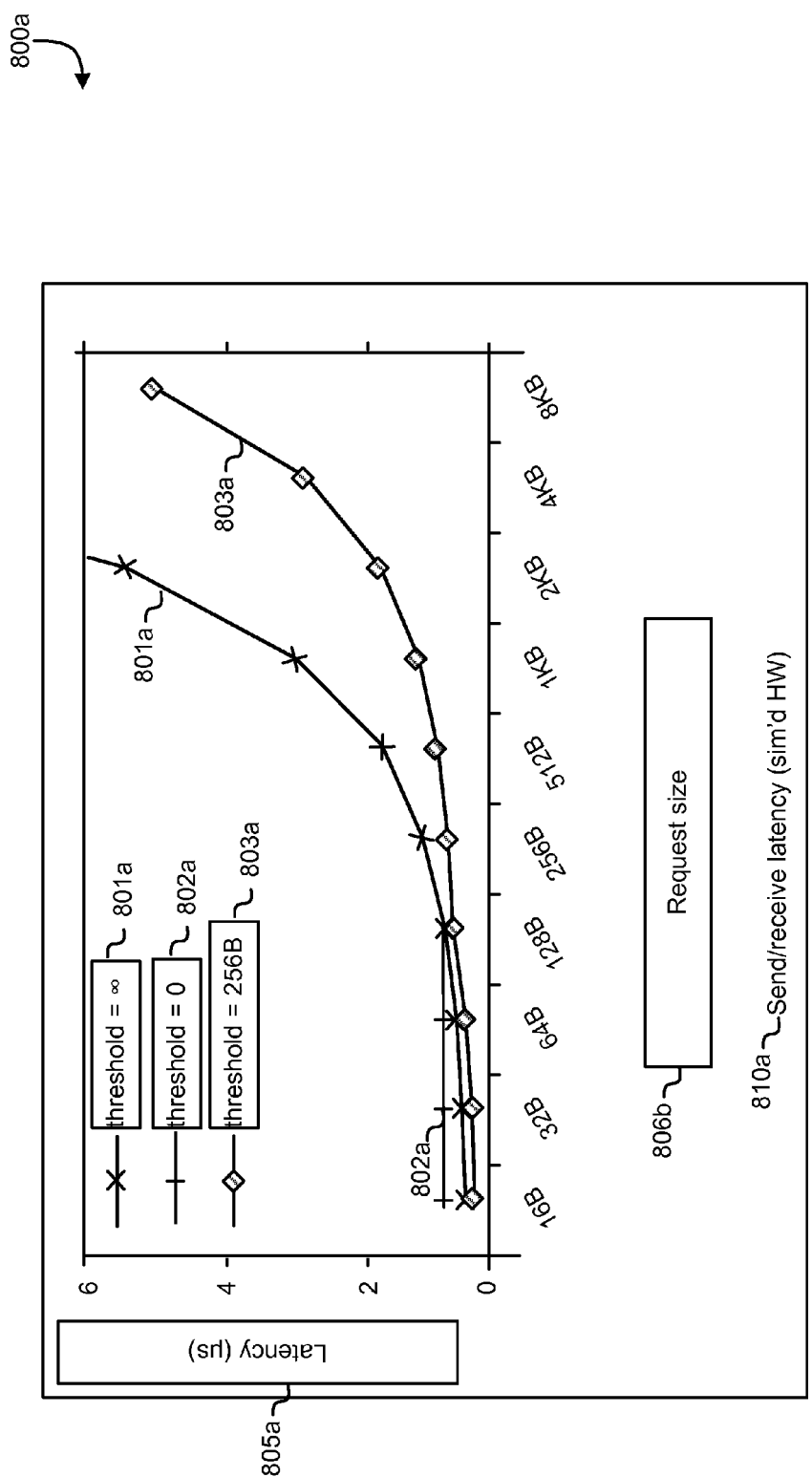
FIG. 8A shows an illustrated example of a graph plotting the latency performance on a simulated hardware platform in accordance with various embodiments of the present disclosure.
Figure 8B:
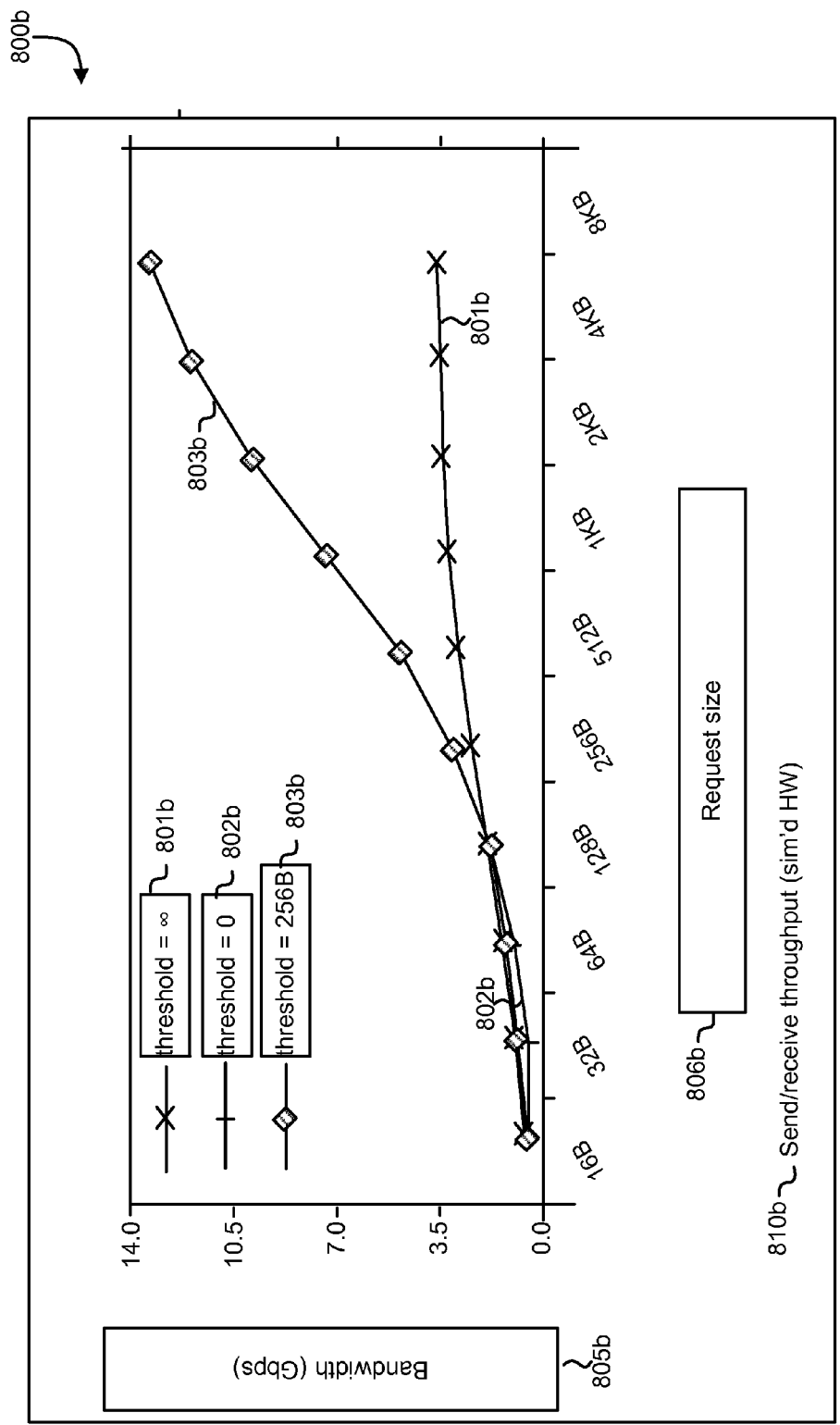
FIG. 8B shows an illustrated example of a graph plotting the bandwidth performance on a simulated hardware platform in accordance with various embodiments of the present disclosure.

FIG. 8A shows an illustrated example of a graph 800a plotting the latency performance on a simulated hardware platform in accordance with various embodiments of the present disclosure. FIG. 8B shows an illustrated example of a graph 800b plotting the bandwidth performance on a simulated hardware platform in accordance with various embodiments of the present disclosure. Specifically, the graphs 800a and 800b illustrate the half-duplex latency of the simulation platform in FIG. 8A and bandwidth in the simulation platform in FIG. 8B. The two methods (pull, push) expose a performance tradeoff: push is optimized for small messages, but has significant processor and packetization overheads. The pull method is optimized for large transfers, but requires additional control traffic at the beginning of each transfer.

In one example embodiment, an example optimal boundary between the two mechanisms was determined by setting the threshold to 0 802a/802b and ∞ 801a/801b in two separate runs. The curve 803a shows the performance of the unsolicited primitives with the threshold set to the appropriate value and both mechanisms enabled at the same time. The minimal half-duplex latency is 340 ns and the bandwidth exceeds 10 Gbps with messages as small as 4 KB. For the largest request size evaluated (8 KB), the bandwidth achieved is 12.8 Gbps, a 1.6× increase over Quad Data Rate InfiniBand® for the same request size. The graphs 800a and 800b further disclose a plot of the curves 801a and 802a showing the individual performance of the pull method and the push method separately, showing the clear benefits of using both methods.

Figure 8C:
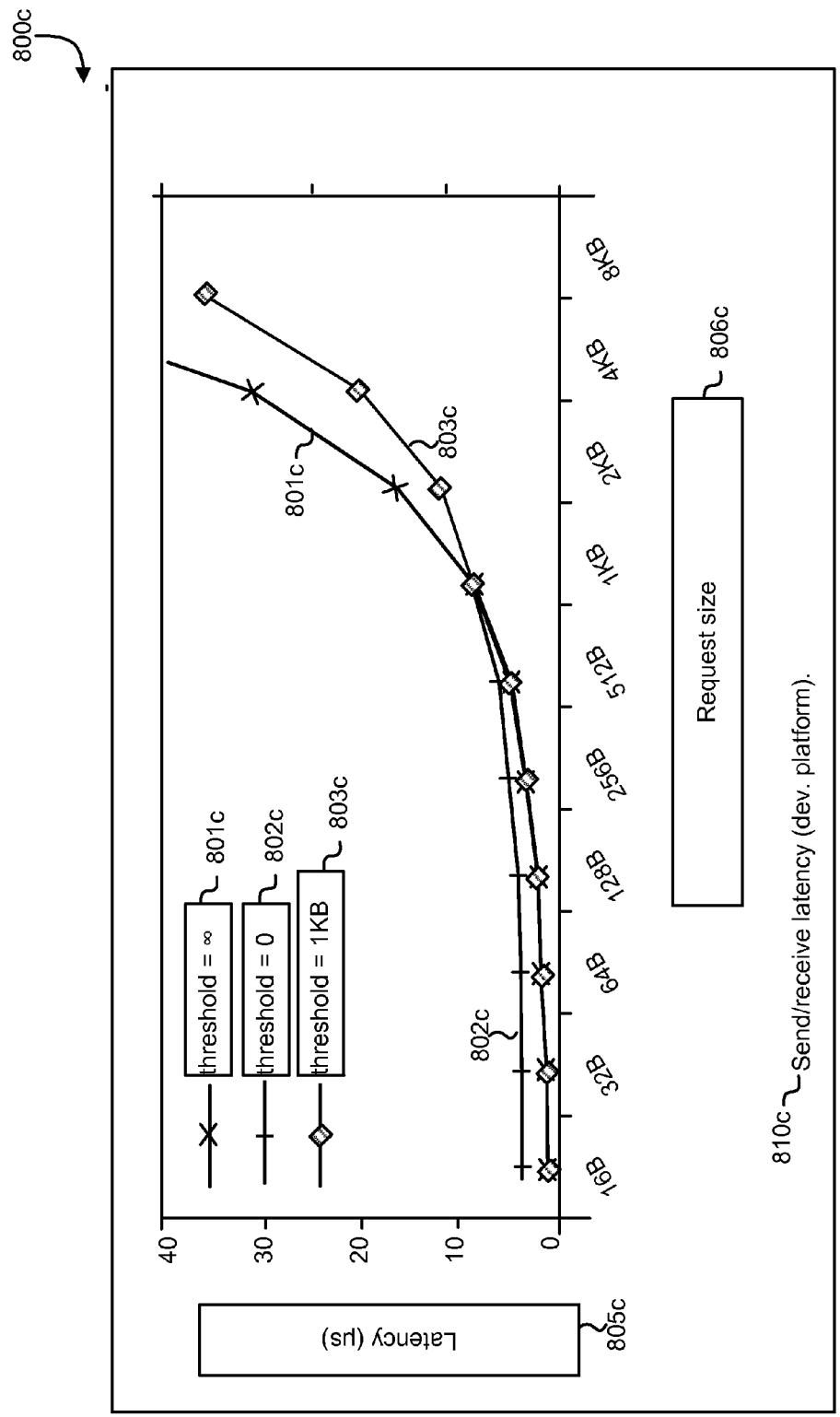
FIG. 8C shows an illustrated example of a graph plotting the latency performance of a development platform in accordance with various embodiments of the present disclosure.

FIG. 8C shows an illustrated example of a graph 800c plotting the latency 805c performance of a development platform in accordance with various embodiments of the present disclosure. In the example embodiment of graph 800c, the send/receive performance on the simulated hardware (latency and bandwidth) and the development platform (latency only) was plotted; the same methodology as used in FIGS. 8A and 8B is simulated here. FIG. 8C illustrates that the minimal half-duplex latency is 1.4 μs, which is only 4× worse than the simulated hardware. However, the threshold 803c is set to a larger value of 1 KB for optimal performance, and the bandwidth is 1/10th of the simulated hardware. The bandwidth graph for the emulation platform is omitted. The relatively low bandwidth and a different threshold are due to the overheads of running the fine-grain communication protocol entirely in software, as described above in connection with Table 1.

Table 2 discloses a comparison of the performance of the simulated soNUMA system with a commercial solution that combines the Mellanox® ConnectX-3 RDMA host channel adapter connected to host Xeon E5-2670 2.60 GHz via a PCIe-Gen3 bus. In the Mellanox® system, the servers are connected back-to-back via a 56 Gbps InfiniBand® link. Four metrics are shown: read bandwidth, read latency, atomic operation latency, and input/output operations per second ("IOPS").

TABLE 2

A comparison of soNUMA and InfiniBand

| Transport | soN Dev. Plat. | LIMA Sim'd HW | RDMA/IB |
|---|---|---|---|
| Max BW (Gbps) | 1.8 | 77 | 50 |
| Read RTT (us) | 1.5 | 0.3 | 1.19 |
| Fetch-and-add (us) | 1.5 | 0.3 | 1.15 |
| IOPS (Mops/s) | 1.97 | 10.9 | 35 @ 4 cores |

As Table 2 shows, compared to the state-of-the-art RDMA solution of the existing technologies, example embodiments of the soNUMA reduce the latency to remote memory by a factor of four. This may be due, in large part, to eliminating the PCIe bus overheads. A soNUMA system is also able to operate at peak memory bandwidth. In contrast, the PCIe-Gen3 bus limits RDMA bandwidth to 50 Gbps, even with 56 Gbps InfiniBand®. In terms of IOPS, the comparison is complicated by the difference in configuration parameters: the RDMA solution uses four QPs and four cores, whereas this implementation of a soNUMA system has a configuration that uses one of each. Per core, both solutions support approximately 10 M remote memory operations.

The performance of atomic operations using fetch-and-add, as measured by the application, is described below. For each of the three platforms, the latency of fetch-and-add is approximately the same as that of the remote read operations on that platform. Also, soNUMA provides more desirable semantics than RDMA. In the case of RDMA, fetch-and-add is implemented by the host channel adapter, which requires the adapter to handle all accesses, even from the local node. In contrast, the example embodiments of soNUMA's implementation presented herein within the node's local cache-coherence provides global atomicity guarantees for any combination of local and remote accesses.

Figure 9:
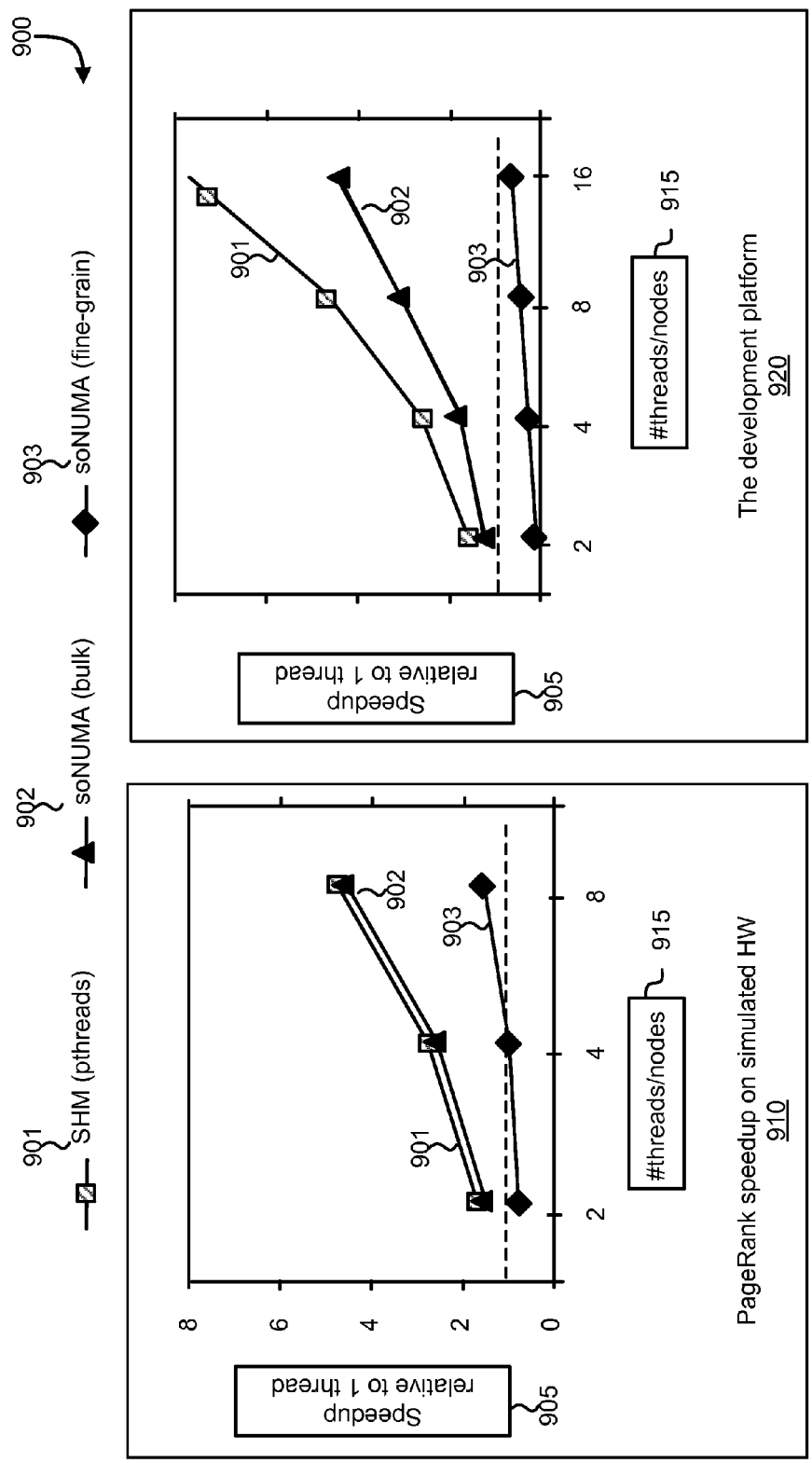
FIG. 9 shows an illustrated example of an environment in which various embodiments of the present disclosure may be practiced.

FIG. 9 shows two graphs 900 in which speedup relative to 1 thread is disclosed according to various embodiments of the present disclosure.

The plot 910 in FIG. 9 illustrates the speedup 905 over the single-threaded 915 baseline of the three implementations on the simulated hardware. Both SHM(pthreads) 901 and soNUMA(bulk) 902 have near identical speedup. In both cases, the speedup trend is determined primarily by the imbalance resulting from the graph partitioning scheme, and not the hardware. However, soNUMA(fine-grain) 903 has noticeably greater overheads, primarily because of the limited per-core remote read rate (due to the software API's overhead on each request) and the fact that each reference to a non-local vertex results in a remote read operation. Indeed, each core can only issue up to 10 million remote operations per second. As described and depicted in connection with FIG. 7(b), the bandwidth corresponding to 64 B requests is a small fraction of the maximum bandwidth of the system.

The plot 920 in FIG. 9 shows the corresponding speedup on the software development platform. That shows the same general trends as on the simulated hardware, with the caveat that the higher latency and lower bandwidth of the development platform limit performance.

Large-scale graph processing engines, key-value stores, and on-line graph query processing are obvious candidate applications for soNUMA. All of them perform very little work per data item (if any) and operate on large datasets, and hence typically require large scale-out configurations to keep the entire data memory resident. Most importantly, they exhibit poor locality as they frequently access non-local data.

Alternative example embodiments of the present invention may be applicable to large-scale graph processing engines, key-value stores, and on-line graph query processing. For example, example embodiments may be used with graph processing and the canonical PageRank algorithm. Embodiments may be based on the widely used Bulk Synchronous Processing model, in which every node computes its own portion of the dataset (range of vertices) and then synchronizes with other participants, before proceeding with the next iteration (so-called superstep).

A first application of embodiments of the present disclosure and the canonical PageRank algorithm is disclosed: (i) SHM(pthreads): The baseline is a standard pthreads implementation that assumes cache-coherent memory rather than soNUMA. For the simulated hardware, an eight-core multiprocessor with 4 MB of LLC per core was modeled. The LLC was provisioned so that the aggregate cache size equals that of the eight machines in the soNUMA setting. Thus, no benefits can be attributed to larger cache capacity in the soNUMA comparison. For the development platform, the application was run on the ccNUMA server as described in connection with FIG. 5, without a hypervisor running underneath the host OS. In this implementation, the application stores two rank values for each vertex: the one computed in the previous superstep and the one currently being computed. Barrier synchronization marks the end of each superstep.

A second application of embodiments of the present disclosure and the canonical PageRank algorithm is disclosed: (ii) soNUMA(bulk): This implementation leverages aggregation mechanisms and exchanges ranks between nodes at the end of each superstep, after the barrier. Such an approach amortizes high inter-node latencies and makes use of wide high-capacity links. In this implementation, spatial locality within the global address space was manipulated by using multi-line requests at the RMC level. At the end of each superstep, every node uses multiple rmc_read_async operations (one per peer) to pull the remote vertex information from each of its peers into the local memory. This allows a concurrent shuffle phase limited only by the bisection bandwidth of the system.

A third application of embodiments of the present disclosure and the canonical PageRank algorithm is disclosed: (iii) soNUMA(fine-grain): This variant leverages the fine-grain memory sharing capabilities of soNUMA, as described and depicted in connection with FIG. 4. Each node issues one rmcjreacLasync operation for each non-local vertex. This implementation resembles the shared-memory programming model of SHM(pthreads), but has consequences: the number of remote memory operations scales with the number of edges that span two partitions rather than with the number of vertices per partition.

In some example embodiments of the present disclosure, by leveraging hardware virtualization and dedicating processing cores to emulate RMCs, an (emulated) soNUMA fabric at wall-clock execution time was run, and that platform was used to develop and validate the protocol, the kernel driver, all user-space libraries, and applications. Such an example embodiment provides the ability to support many variants of remote memory operations that can be handled in a stateless manner by the peer RMC. This includes read, write, and atomic operations. A more complex architecture may use extensions such as the ability to issue remote interrupts as part of an RMC command, so that nodes can communicate without polling. This has a number of implications for system software, e.g., to efficiently convert interrupts into application messages, or to use the mechanisms to build system-level abstractions such as global buffer caches.

One utility of a soNUMA system in accordance with the present disclosure is dealing with the conflicting trend of (i) large dataset applications that require tight and unpredictable sharing of resources; and (ii) many core designs, which are optimized for throughput rather than resource aggregation. Although examples using a simple graph application are shown here, other applications might also be informative. The regular, batch-oriented nature of that application is also a good fit for coarse-grain, scale-out models. Many applications such as on-line graph processing algorithms, in-memory transaction processing systems, and key-value stores demand low latency and can take advantage of one-sided read operations. These applications are designed to assume that both client and server have access to a low-latency fabric, providing them with large performance improvements when implemented using soNUMA in accordance with the present disclosure.

Example embodiments of soNUMA systems in accordance with the instant disclosure may be sufficiently large to capture very large datasets within a single cluster, and yet sufficiently small to avoid introducing new classes of problems, such as the need for fault containment. Industry solutions today provide rack-insert solutions that are ideally suited for soNUMA. Beyond that, rack-level solutions are alternative available options; for example, a 44 U rack of Viridis® chassis can thus provide over 1000 nodes within a two-meter diameter, affording both low wire delay and massive memory capacity. Example embodiments may further be applicable to system-level resource sharing, e.g., to create a single-system image or a global file-system buffer cache, or to rethink resource management in hypervisor clusters.

While most of the example embodiments presented herein focused on data sharing within a single soNUMA fabric, however, these embodiments may also be scaled depending on the size of datasets. For example, for very large datasets, datacenter deployments would likely interconnect multiple rack-scale soNUMA systems using conventional networking technologies. Example embodiments may further be scaled to maximize resource management (e.g., to maximize locality) and networking (e.g., how to use the soNUMA fabric to run network protocols).

One advantage of soNUMA over prior proposals on fast messaging and remote one-sided primitives is the tight integration of the Network Interface ("NI") into the coherence domain. The advantage of such an approach was previously demonstrated in Coherent Network Interfaces ("CNI"), which leverages the coherence mechanism to achieve low-latency communication of the NI with the processors, using cacheable work queues. More recent work showcases the advantage of integration, but in the context of kernel-level TCP/IP optimizations, such as a zero-copy receive. The RMC of example embodiments is fully integrated into the local cache-coherence hierarchy and does not depend on local DMA operations. The simple design of the RMC suggests that integration into the local cache-coherence domain is practical. Such integration can lead to substantial benefits by keeping the control data structures, such as the QPs and page tables, in caches. soNUMA also provides global atomicity by implementing atomic operations within a node's cache hierarchy.

Example embodiments of the present disclosure disclose significant improvements on previously existing technologies. For example, partitioned global address space ("PGAS") relies on compiler and language support to provide the abstraction of a shared address space on top of non-coherent, distributed memory. Languages, such as Unified Parallel C and Titanium, require the programmer to reason about data partitioning and be aware of data structure non-uniformity. However, the compiler frees the programmer from the burden of ensuring the coherence of the global address space by automatically converting accesses to remote portions into one-sided remote memory operations that correspond to soNUMA's own primitives. PGAS also provides explicit asynchronous remote data operations, which also easily map onto soNUMA's asynchronous library primitives. The efficiency of soNUMA remote primitives would allow PGAS implementations to operate faster.

For example, software distributed shared memory ("DSM") provides global coherence not present in the memory hierarchies of PGAS and soNUMA. Pure software DSM systems expose a global coherent virtual address space and rely on OS mechanisms to "fault in" pages from remote memory on access and propagate changes back, typically using relaxed memory models. Like software DSM, soNUMA operates at the virtual memory level. Unlike software DSM, soNUMA and PGAS target fine-grained accesses whereas software DSM typically operates at the page level.

Example embodiments of the present disclosure are further significant improvements on cache-coherent memory ("ccNUMA") designs create a compute fabric of processing elements, each with its own local memory, and provide cache-coherent physical memory sharing across the nodes. soNUMA uses the non-uniform aspect of memory and leverages the lower levels of the ccNUMA protocols, but does not attempt to ensure cache-coherence. As a result, soNUMA uses a stateless protocol, whereas cc-NUMA requires some global state such as directories to ensure coherence, which limits its scalability. The ccNUMA designs provide a global physical address space, allowing conventional single-image operating systems to run on top. The single-image view, however, makes the system less resilient to faults. In contrast, soNUMA exposes the abstraction of global virtual address spaces on top of multiple OS instances, one per coherence domain.

Example embodiments of the present disclosure provide significant improvements over existing user-level messaging techniques, fast messaging techniques, and latency-lowering techniques. For example, user-level messaging eliminates the overheads of kernel transitions by exposing communication directly to applications. Hybrid ccNUMA designs provide architectural support for user-level messaging in conjunction with cache-coherent memory. In contrast, soNUMA's minimal design allows for an efficient implementation of message passing entirely in software using one-sided remote memory operations. For example, Fast Messages target low latency and high bandwidth for short user-level messages. In soNUMA, the RMC provides architectural support for both one-sided read and write operations; messaging is implemented on top of these basic abstractions. For example, remote memory access can also be implemented efficiently for graph processing on commodity hardware by leveraging aggressive multithreading to compensate for the high access latency. soNUMA also hides latency but uses asynchronous read operations instead of multithreading.

Figure 10:
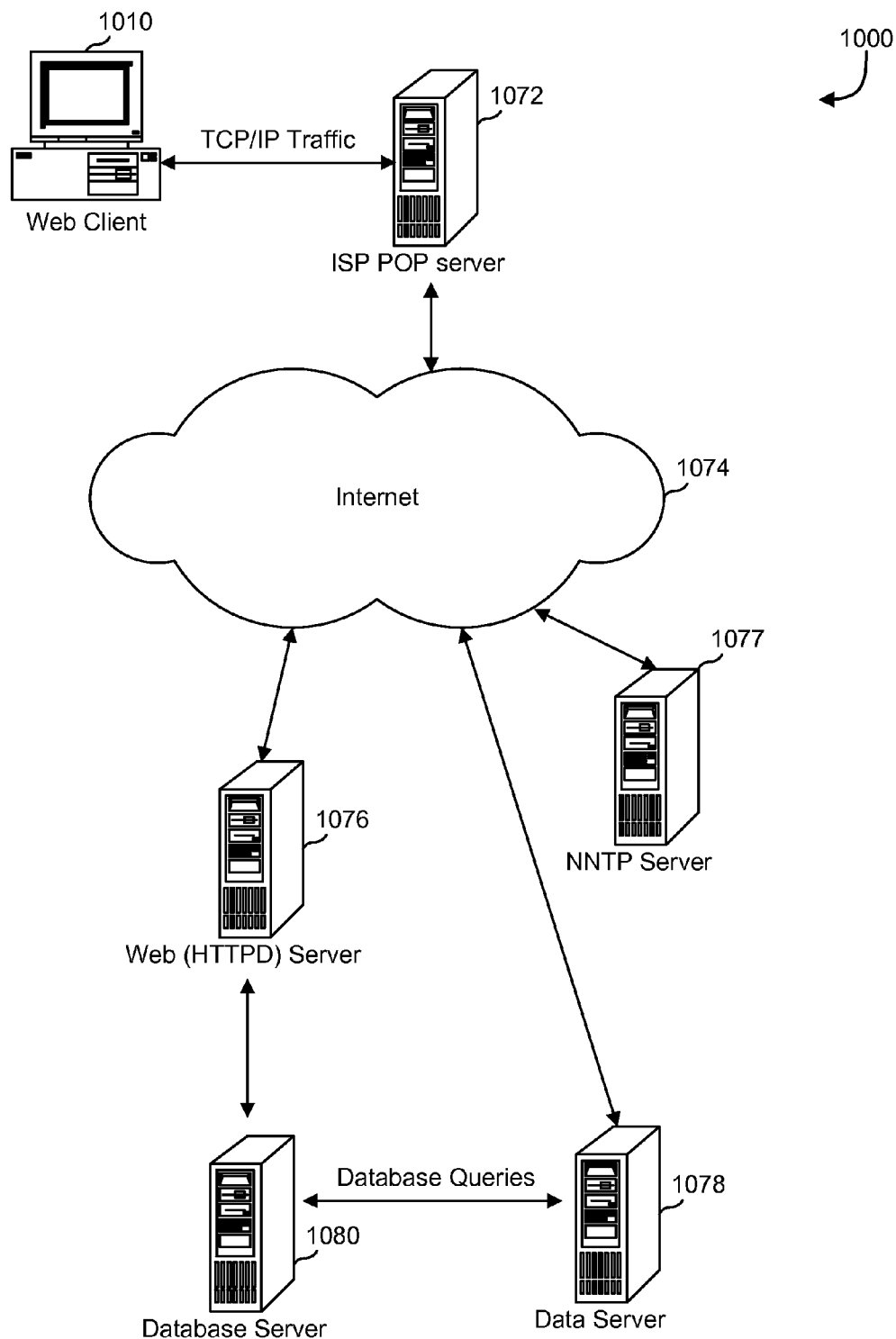
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device, such as the web client 1010, which can include any appropriate device operable to send and/or receive requests, messages, or information over an appropriate network 1074 and, in some embodiments, convey information back to a user of the device. Examples of such client devices include personal computers, cell phones, laptop computers, tablet computers, embedded computer systems, electronic book readers, and the like. In this example, the network includes the Internet, as the environment includes a web server 1076 for receiving requests and serving content in response thereto and at least one application server 1077. It should be understood that there could be several application servers. Servers, as used herein, may be implemented in various ways, such as hardware devices or virtual computer systems. In some contexts, servers may refer to a programming module being executed on a computer system. The example further illustrate a database server 1080 in communication with a data server 1078, which may include or accept and respond to database queries.

It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

The foregoing examples illustrate certain example embodiments of the invention from which other embodiments, variations, and modifications will be apparent to those skilled in the art. The invention should therefore not be limited to the particular embodiments discussed above, but rather is defined by the claims.

While this invention has been particularly shown and described with references to example embodiments thereof, it will be understood by those skilled in the art that various changes in form and details may be made therein without departing from the scope of the invention encompassed by the appended claims.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, data servers, Java servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system forming a node of a multi-node distributed system that is not constrained to be globally cache-coherent, the computer system comprising:
   a processor that executes memory operations;
   a local cache that stores data against which the processor executes local memory operations of the memory operations;
   a remote memory controller, coupled to at least a part of the local cache and to the processor, against which the processor executes remote memory operations of the memory operations, wherein the remote memory controller interacts with the processor using locally cache-coherent interactions; and
   an interface between the remote memory controller and a network interface wherein the remote memory controller issues stateless requests from the remote memory controller to a remote node of the multi-node distributed system via the network interface and receives stateless replies from the remote node via the network interface, the stateless requests and the stateless replies being stateless in that the remote node can process the stateless requests from data provided with the stateless requests and local configuration state.

2. The computer system of claim 1, wherein the remote memory controller is hardwired.

3. The computer system of claim 1, wherein the remote memory controller is configured with logic for converting memory operations into sets of exchange operations, wherein each exchange operation comprises a stateless request sent from the remote memory controller to the remote node and a stateless reply received from the remote node in response to the stateless request.

4. The computer system of claim 1, wherein the stateless requests are one-sided memory operations that access a partitioned global address space that spans multiple nodes of the multi-node distributed system.

5. A computer-implemented method for low-latency distributed memory, comprising:
under control of one or more computer systems configured with executable instructions,
enabling remote memory requests through locally cache-coherent interactions being transmitted via a remote memory controller, wherein the remote memory controller is configured to interface directly with an on-die network interface;
converting, at the remote memory controller, application commands into remote requests, wherein the remote requests are transmitted to the on-die network interface and wherein the remote requests are stateless requests to a remote node, the stateless requests being stateless in that the remote node can process the stateless requests from data provided with the stateless requests and local configuration state; and
initiating, by the remote memory controller, remote memory access transactions in response to an application remote memory request.

6. The computer-implemented method of claim 5, further comprising:
providing at least three hardwired data processing elements; and
interconnecting the least three hardwired data processing elements with a work queue, a completion queue, and the on-die network interface.

7. The computer-implemented method of claim 5, further comprising:
enabling, via a queue pair, an application to schedule remote memory operations; and
receiving completion notifications of a completion of the remote memory operations.

8. The computer-implemented method of claim 7, wherein the queue pair comprises a work queue and a completion queue.

9. The computer-implemented method of claim 5, further comprising servicing, at the remote memory controller, remote memory access originating at a local node and requests originating from the remote node.

10. The computer-implemented method of claim 8, wherein the queue pair comprises a work queue and a completion queue, the computer-implemented method further comprising polling, by the remote memory controller, the work queue to detect the application remote memory requests.

11. A computer system forming a node of a multi-node distributed system that is not constrained to be globally cache-coherent, the computer system comprising:
a processor that executes memory operations;
a local cache that stores data against which the processor executes local memory operations of the memory operations;
a remote memory controller, coupled to at least a part of the local cache and to the processor, against which the processor executes remote memory operations of the memory operations, wherein the remote memory controller interacts with the processor using locally cache-coherent interactions and wherein the remote memory controller comprises:
(a) a context identifier to create a global address space that spans multiple nodes of the multi-node distributed system;
(b) a context segment, the context segment being a range of the node's local address space that is globally accessible to other nodes of the multi-node distributed system;
(c) a queue pair being usable by an application to schedule remote memory operations and to receive notification of completion of the memory operations; and
(d) a local buffer being usable as a source for, or a destination of, the remote memory operations; and
an interface between the remote memory controller and a network interface wherein the remote memory controller issues stateless requests from the remote memory controller to a remote node of the multi-node distributed system via the network interface and receives stateless replies from the remote node via the network interface, the stateless requests and the stateless replies being stateless in that the remote node can process the stateless requests from data provided with the stateless requests and local configuration state.

12. The computer system of claim 11, wherein the remote memory controller further comprises:
a first interface, wherein the first interface is a coherent memory interface to a private L1 cache; and
a second interface, wherein the second interface is the network interface and is an interface to an on-die router.

13. The computer system of claim 11, wherein the remote memory controller further comprises at least three hardwired data processing elements, wherein the at least three hardwired data processing elements comprise:
a first data processing element configured to control request generation;
a second data processing element configured to control remote request processing; and
a third data processing element configured to control request completion.

14. The computer system of claim 13, wherein each of the at least three hardwired data processing elements is operably interconnected to distinct queues of the network interface.

15. The computer system of claim 13, wherein memory requests of the at least three data processing elements are configured to access a cache via a memory management unit.

16. The computer system of claim 13, wherein the remote memory controller is further configured to:
unroll multi-line requests in hardware; and
generate a sequence of line-sized read or write transactions.

17. The computer system of claim 13, wherein the remote memory controller and a corresponding private L1 cache are fully integrated into a coherence domain of the node.

* * * * *